(12) United States Patent
Puiu et al.

(10) Patent No.: US 10,495,223 B2
(45) Date of Patent: Dec. 3, 2019

(54) SHIFT BY WIRE PARKING SYSTEM

(71) Applicant: GM GLOBAL TECHNOLOGY OPERATIONS LLC, Detroit, MI (US)

(72) Inventors: Dumitru Puiu, Sterling Heights, MI (US); Vijay A. Neelakantan, Rochester Hills, MI (US); Gurdeep Singh, Canton, MI (US); Ryan M. Jenness, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 161 days.

(21) Appl. No.: 15/868,212

(22) Filed: Jan. 11, 2018

(65) Prior Publication Data

US 2019/0211928 A1 Jul. 11, 2019

(51) Int. Cl.
*F16H 63/34* (2006.01)
*F16H 61/22* (2006.01)
*B60T 1/00* (2006.01)

(52) U.S. Cl.
CPC .......... *F16H 63/3475* (2013.01); *B60T 1/005* (2013.01); *F16H 63/3425* (2013.01)

(58) Field of Classification Search
CPC .. F16H 63/3475; F16H 63/3425; F16H 61/22; F16H 63/3416; F16H 63/34; B60T 1/005
See application file for complete search history.

(56) References Cited

U.S. PATENT DOCUMENTS

| | | | |
|---|---|---|---|
| 4,518,066 A | | 5/1985 | Barr |
| 6,161,672 A | * | 12/2000 | Maeda ................ F16H 61/22 192/220.2 |
| 6,290,047 B1 | | 9/2001 | Adamczyk et al. |
| 6,419,068 B1 | | 7/2002 | Stephan et al. |
| 6,701,797 B2 | * | 3/2004 | Heuver ................ B60T 1/005 192/219.5 |
| 6,983,668 B2 | | 1/2006 | Powell et al. |
| 7,075,023 B2 | | 7/2006 | Kent et al. |
| 7,204,785 B2 | | 4/2007 | Berger et al. |
| 7,284,648 B2 | | 10/2007 | Reed et al. |

(Continued)

OTHER PUBLICATIONS

U.S. Appl. No. 15/288,399, filed Oct. 7, 2016 by GM Global Technology Operations LLC.

(Continued)

*Primary Examiner* — Tinh T Dang

(57) ABSTRACT

A parking actuator assembly for an automatic transmission includes a park pawl that is rotatable between an in-park position and an out-of-park position. An actuator assembly is configured to be moved between a park-actuated position and a park-disengaged position, the actuator assembly being configured to rotate the park pawl into the in-park position when the actuator is moved into the park-actuated position. An actuator rod is slidably coupled to the actuator assembly. In some forms, the actuator assembly remains in contact with the park pawl from the park-actuated position to the park-disengaged position. In some forms, at least one latching solenoid is included, and the latching solenoid(s) as well as a park actuator motor may be disposed within a main transmission system. A verification sensor may be included to determine the position.

20 Claims, 14 Drawing Sheets

(56) References Cited

U.S. PATENT DOCUMENTS

| | | | |
|---|---|---|---|
| 7,757,832 B2 | 7/2010 | Sauter et al. | |
| 7,832,541 B2 | 11/2010 | Joshi et al. | |
| 7,963,882 B2 | 6/2011 | Nishimura | |
| 8,053,691 B2 | 11/2011 | Vernacchia et al. | |
| 8,950,563 B2 | 2/2015 | Kayukawa et al. | |
| 9,255,640 B1 | 2/2016 | Sten et al. | |
| 9,321,435 B2 | 4/2016 | Landino et al. | |
| 9,394,991 B2 | 7/2016 | Swaita et al. | |
| 9,435,428 B2 | 9/2016 | Neelakantan et al. | |
| 9,777,836 B1 | 10/2017 | Lee et al. | |
| 9,869,389 B2 | 1/2018 | Rhoades et al. | |
| 10,161,518 B2 * | 12/2018 | Neelakantan | F16H 63/3466 |
| 2016/0069451 A1 | 3/2016 | McDonough et al. | |
| 2016/0208916 A1 | 7/2016 | Kokubu et al. | |
| 2017/0088111 A1 * | 3/2017 | Kirchner | B60T 1/005 |
| 2018/0051804 A1 | 2/2018 | Singh et al. | |
| 2018/0112774 A1 * | 4/2018 | Littlefield | F16H 63/3466 |

OTHER PUBLICATIONS

U.S. Appl. No. 15/299,497, filed Oct. 21, 2016 by GM Global Technology Operations LLC.

\* cited by examiner

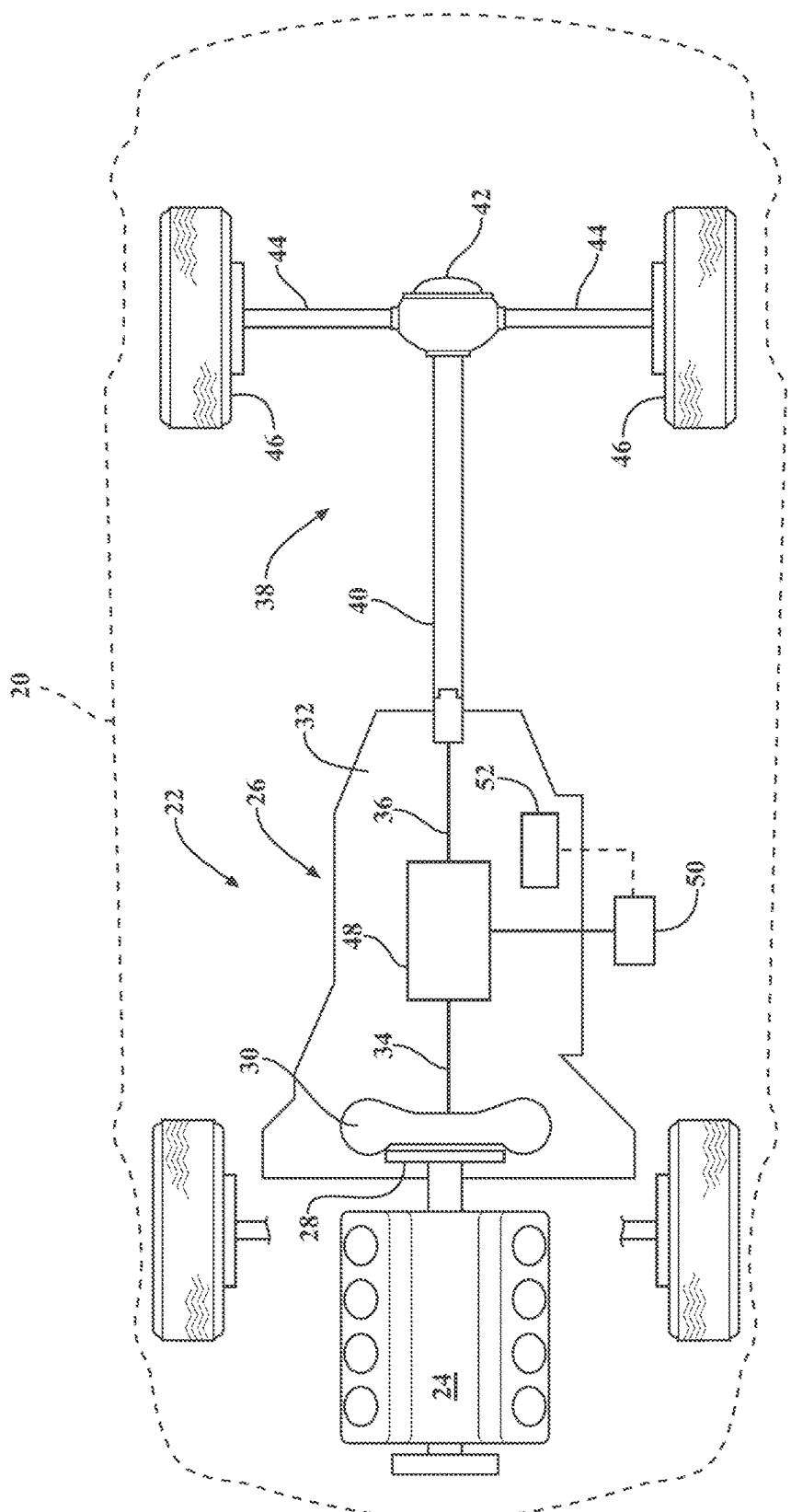

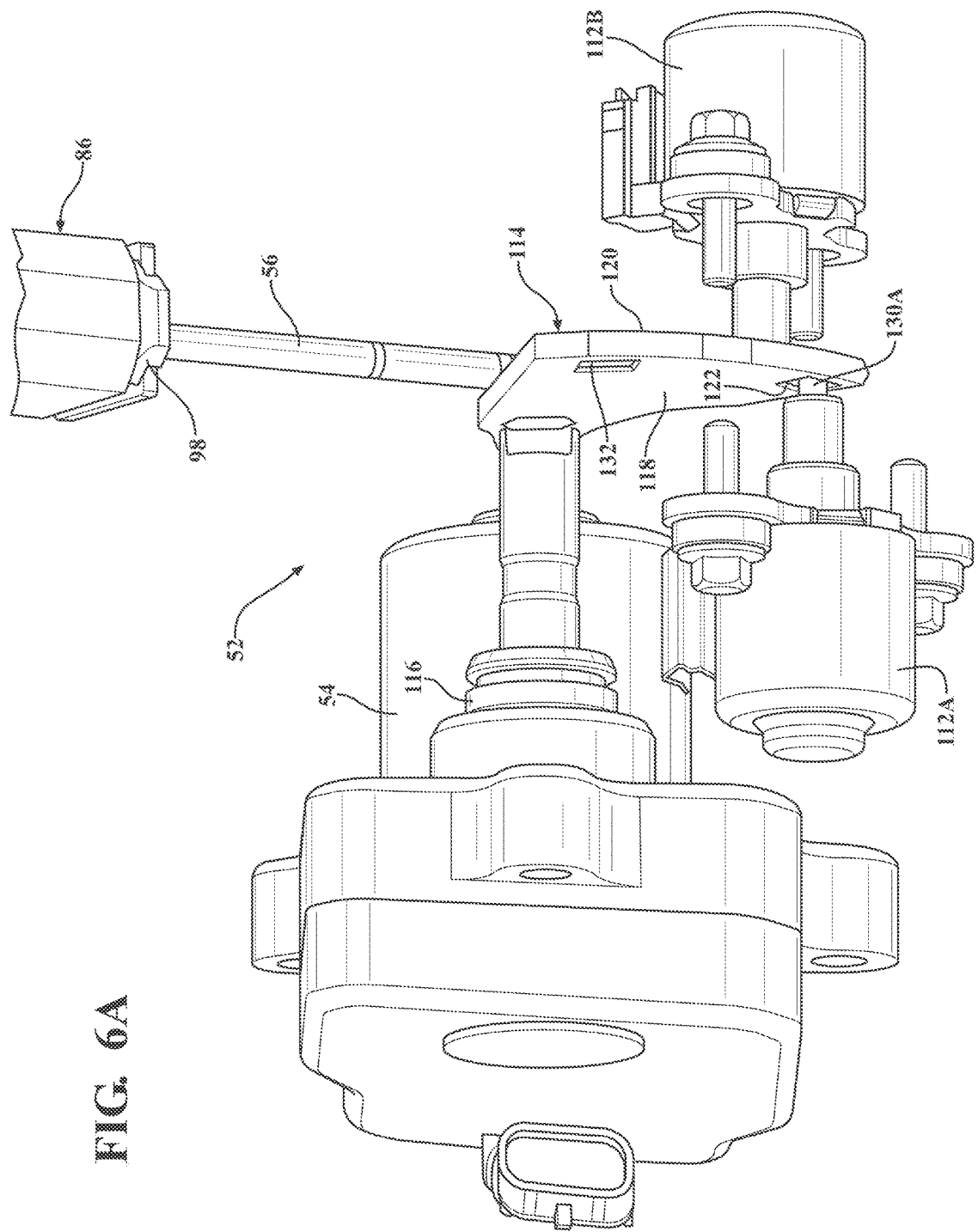

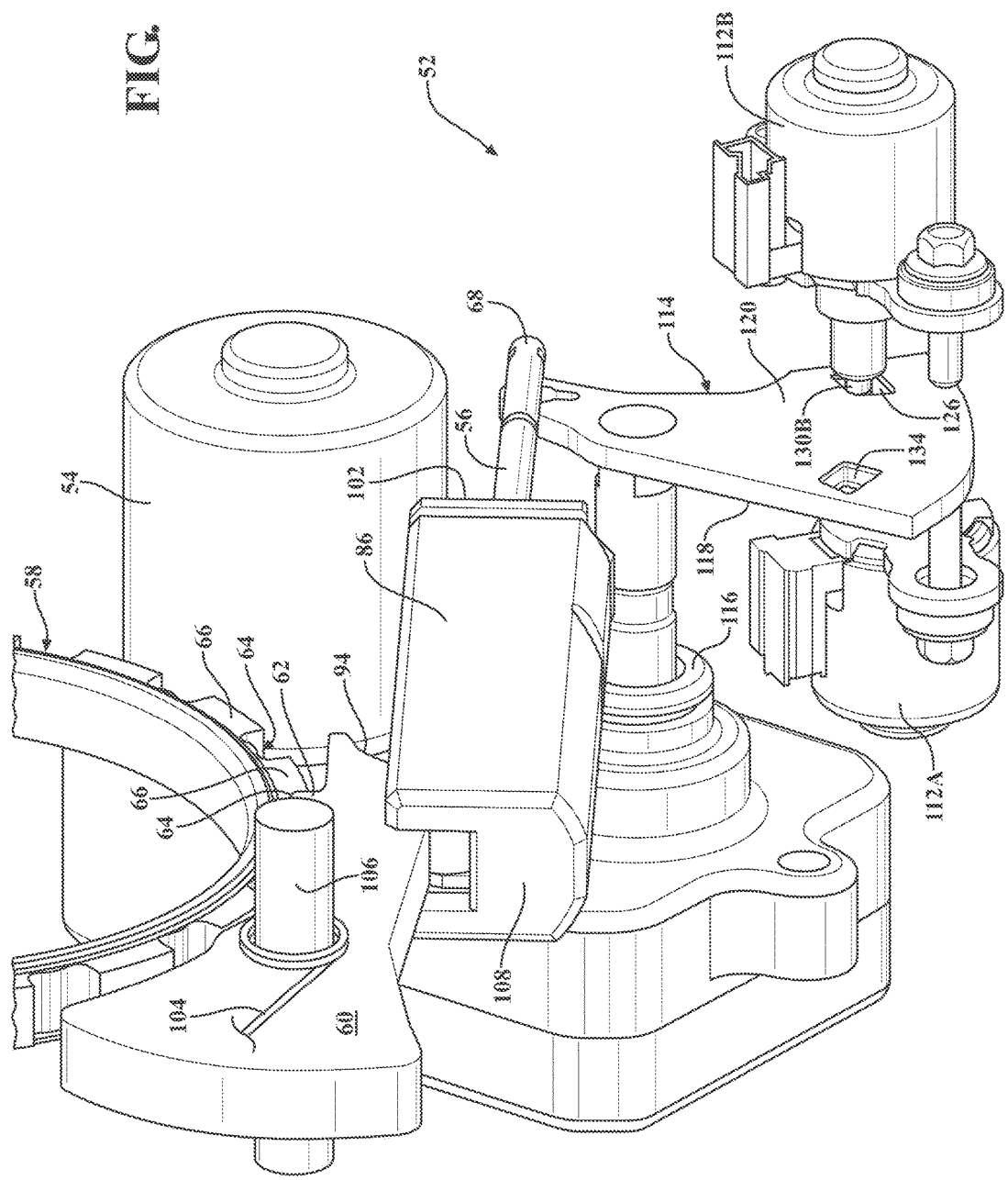

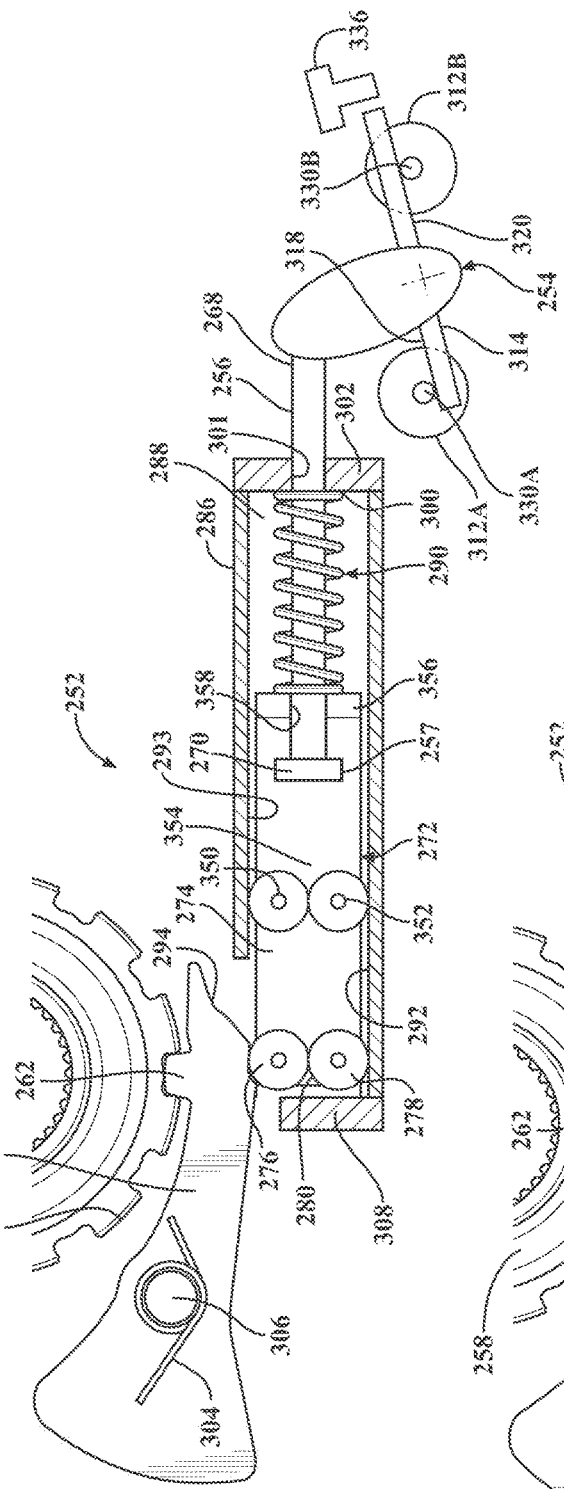
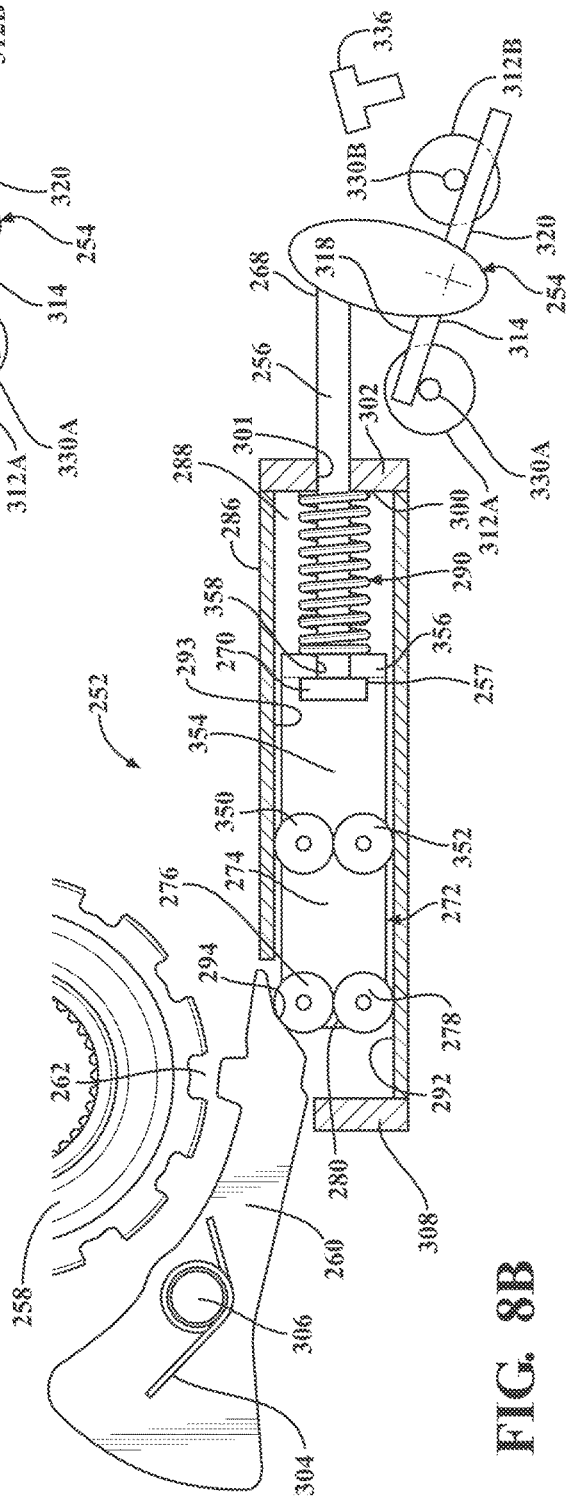
FIG. 8A
FIG. 8B

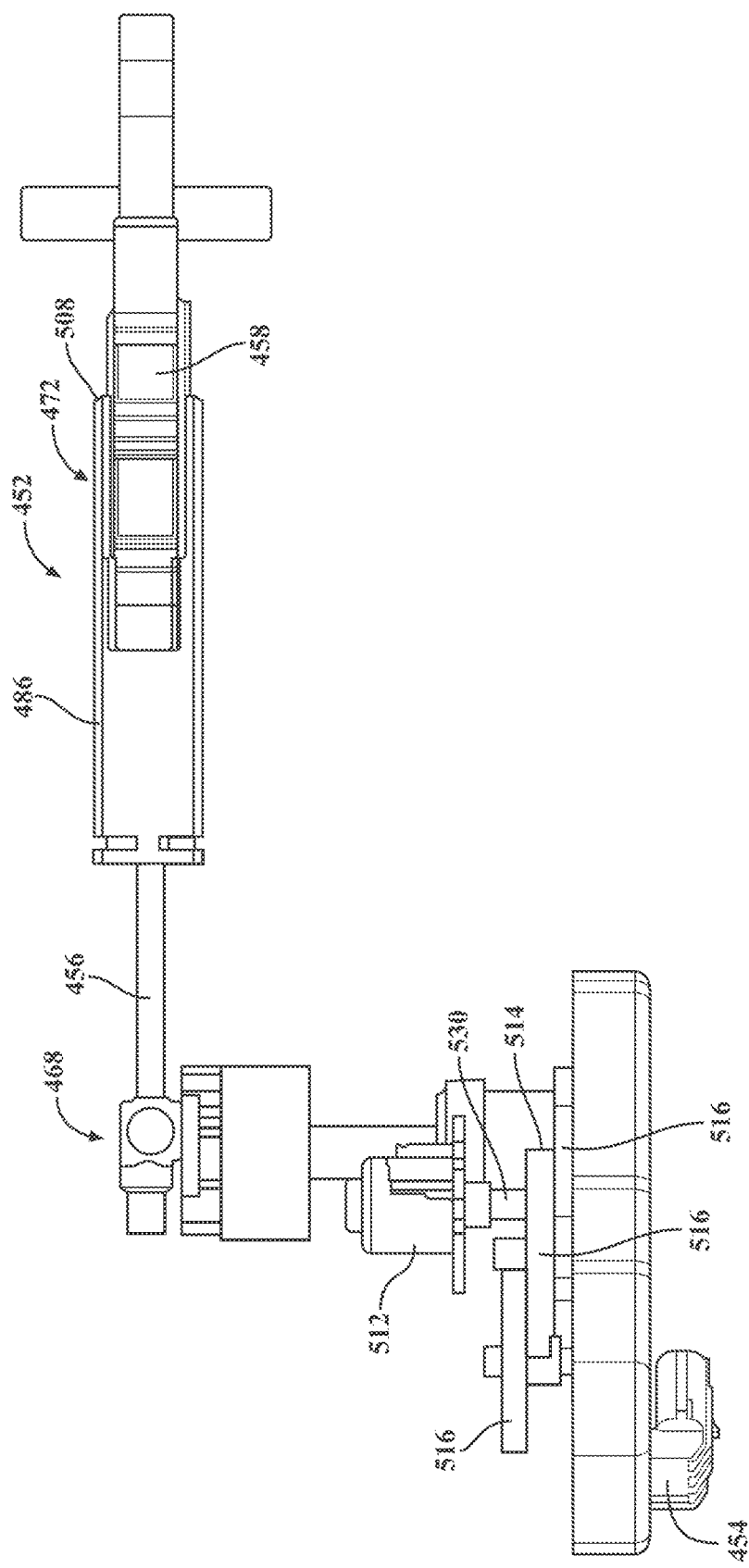

SHIFT BY WIRE PARKING SYSTEM

FIELD

The present disclosure relates to an electronically actuated park engagement system for an automatic transmission.

INTRODUCTION

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

The transmission generally operates in a plurality of modes of operation including out-of-Park driving modes and a Park mode. The out-of-Park driving modes generally include the forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission.

Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers.

A park brake mechanism may be included to resist the vehicle's natural tendency to roll down a sloped surface when the vehicle is in park. Such park brake mechanisms generally include a park gear that is fixed with respect to the output shaft of the transmission and a park pawl designed to selectively engage with the gear when the park brake mechanism is activated. The park pawl substantially prevents the output shaft and the attached park gear from rotating when the park pawl engages with recesses between gear teeth of the park gear.

It is desirable that ETRS control systems meet specific safety requirements during particular failure modes of operation. In the absence or reduced availability of hydraulic systems in these new propulsion system architectures, these safety related functions are typically met for a parking brake mechanism by mounting a parking system external to the housing of the transmission. A shaft may extend out of the transmission housing to be connected to this external parking brake system.

It is desirable that the parking brake system provide several features, including: defaulting to park in a complete power loss situation; maintaining an out-of-park configuration when desired despite a single element failure; and maintaining the motive ability to move between the out-of-park configuration and park configuration and vice-versa, on command. To provide all of these features, the external parking brake system typically includes electromechanical actuators with motors, sensors, controllers, etc., and includes redundancy to ensure safety. Such an external parking brake system is bulky, expensive, and complex with several components.

SUMMARY

A parking actuator assembly for an automatic transmission is provided that includes several components disposed within a main transmission system. For example, a park actuator motor, one or more latching solenoids, and a position sensor may all be integrated into the main transmission system. Redundant default-to-park functionality may be included, as well as a robust rolling actuator assembly that includes at least one continuous contact point with a guide and/or a continuous contact with the park pawl, by way of example.

In one form, which may be combined with or separate from the other forms disclosed herein, a parking actuator assembly for an automatic transmission is provided. The parking actuator assembly includes an actuator assembly and an actuator rod defining a distal end. The actuator assembly has a body portion, a first roller, and a second roller. The first and second rollers are rotatably attached to the body portion. The distal end of the actuator rod is slidably coupled to the actuator assembly. A guide is disposed about the actuator assembly and the distal end of the actuator rod. A park pawl is disposed in rolling contact with the first roller. The park pawl is rotatable between an in-park position and an out-of-park position. The actuator assembly is configured to be moved between a park-actuated position and a park-disengaged position corresponding to the in-park and out-of-park positions of the park pawl, respectively. The first roller contacts the park pawl in the park-actuated position and in the park-disengaged position.

In another form, which may be combined with or separate from the other forms disclosed herein, a parking actuator assembly for an automatic transmission is provided. The parking actuator assembly has a park pawl that is rotatable between an in-park position and an out-of-park position and an actuator assembly configured to be moved between a park-actuated position and a park-disengaged position. The actuator assembly is configured to rotate the park pawl into the in-park position when the actuator assembly is moved into the park-actuated position. An actuator rod defines a proximal end and a distal end. The distal end of the actuator rod is slidably coupled to the actuator assembly. A guide is disposed about the actuator assembly and the distal end of the actuator rod, and the actuator assembly is movable within the guide. A park lever is rotatably attached to the proximal end of the actuator rod. The park lever is rotatable to move the actuator rod with respect to the guide. The park lever is rotatable between a first position corresponding to the park-actuated position of the actuator assembly and a second position corresponding to the park-disengaged position of the actuator assembly. A park actuator motor is included that is configured to cause rotation of the park lever to move the actuator rod. The actuator rod is configured to pull the actuator assembly into the park-disengaged position by rotating the park lever. A verification sensor is disposed adjacent to the park lever, the verification sensor being configured to determine a position of the park lever.

In yet another form, which may be combined with or separate from the other forms disclosed herein, an automatic transmission assembly is provided that includes a park pawl. The park pawl is rotatable between an in-park position and an out-of-park position. An actuator assembly is configured to be moved between a park-actuated position and a park-disengaged position. The actuator assembly is configured to rotate the park pawl into the in-park position when the actuator is moved into the park-actuated position. An actuator rod defines a proximal end and a distal end. The distal end of the actuator rod is slidably coupled to the actuator assembly. A guide is disposed about the actuator assembly and the distal end of the actuator rod, and the actuator assembly is movable within the guide. A main transmission system has a housing. A park lever, a park actuator motor, and a solenoid are each disposed in the housing. The park lever is rotatably attached to the proximal end of the actuator rod. The park lever is rotatable to move the actuator rod with respect to the guide, the park lever being rotatable between a first position corresponding to the park-actuated position of the actuator assembly and a second position corresponding to the park-disengaged position of the actuator assembly. The park actuator motor is configured to cause rotation of the park lever to move the actuator rod. The actuator rod is configured to pull the actuator assembly into the park-disengaged position by rotating the park lever. The solenoid is disposed in the housing adjacent to the park lever. The solenoid has a solenoid plunger, and the solenoid is configured to actuate the solenoid plunger to latch the park lever to hold the actuator assembly in the park-disengaged position.

Additional features may be provided, including but not limited to the following: the second roller contacting the guide in the park-actuated position and in the park-disengaged position; the guide defining an internal planar surface; the second roller being configured to roll along the internal planar surface from the park-actuated position to the park-disengaged position; the first and second rollers being disposed at a distal end of the body portion; the actuator assembly further comprising a round bullet end disposed at a proximal end of the body portion; the round bullet end being in sliding contact with an interior surface of the guide; the actuator rod being slidably connected to the round bullet end; the actuator rod being configured to pull the actuator assembly into the park-disengaged position; a spring enclosed within the guide adjacent to the round bullet end; the spring being configured to bias the actuator assembly into the park-actuated position; a park lever rotatably attached to a proximal end of the actuator rod; the park lever being rotatable to move the actuator rod with respect to the guide; the spring being disposed about the actuator rod and in contact with the round bullet end; the spring being detached from the actuator rod and the guide; a solenoid disposed adjacent to the park lever; the solenoid having a solenoid plunger; the solenoid being configured to actuate the solenoid plunger to latch the park lever to hold the actuator assembly in the park-disengaged position; and a park actuator motor configured to cause rotation of the park lever to move the actuator rod.

Further additional features may be provided, including but not limited to the following: a second solenoid having a second solenoid plunger; the second solenoid being configured to actuate the second solenoid plunger to latch the park lever to hold the actuator assembly in the park-disengaged position; the park lever having a first face and a second face opposed to the first face; the first face defining a first ramped slot; the second face defining a second ramped slot; the first solenoid plunger being disposed in the first ramped slot to latch the park lever to hold the actuator assembly in the park-disengaged position; the second solenoid plunger being disposed in the second ramped slot to latch the park lever to the hold the actuator assembly in the park-disengaged position; the first solenoid being further configured to actuate the first solenoid plunger to latch the park lever to hold the actuator assembly in the park-actuated position; the second solenoid being further configured to actuate the second solenoid plunger to latch the detent assembly to hold the actuator assembly in the park-actuated position; the park lever defining a third ramped slot in the first face; and the first solenoid plunger being disposed in the third ramped slot to latch the park lever to hold the actuator assembly in the park-actuated position.

Other additional features may be provided, including but not limited to the following: a main transmission system; each of the park actuator motor, the first solenoid, and the second solenoid being disposed within the main transmission system; the park lever being movable between a first position corresponding to the park-actuated position of the actuator assembly and a second position corresponding to the park-disengaged position of the actuator assembly; a verification sensor disposed adjacent to the park lever and configured to determine a position of the park lever; the first roller being located along a first side of the actuator assembly and the second roller being located along a second side of the actuator assembly; a third roller located along the first side of the actuator assembly and a fourth roller located along the second side of the actuator assembly; the third roller being spaced apart from the first roller and the fourth roller being spaced apart from the second roller; the third and fourth rollers contacting the guide in the park-actuated position and in the park-disengaged position; the third roller being configured to roll along the (first) planar surface from the park-actuated position to the park-disengaged position; the guide further defining a second planar surface; the fourth roller being configured to roll along the second planar surface from the park-actuated position to the park-disengaged position; and wherein the actuator assembly is held in the park-disengaged position by moving the park actuator motor into a top dead center range position and extending the solenoid plunger into a slot defined within a face of the park lever.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic diagram of an exemplary propulsion system in a motor vehicle, in accordance with the principles of the present disclosure;

FIG. 6A is a first side perspective view of a portion of the parking actuator assembly of FIGS. 2A-5, in accordance with the principles of the present disclosure;

FIG. 6B is a second side perspective view of a portion of the parking actuator assembly of FIGS. 2A-6A, in accordance with the principles of the present disclosure;

FIG. 8A is a side cross-sectional view of another exemplary parking actuator assembly that may be used with the propulsion system of FIG. 1, in an in-park position, according to the principles of the present disclosure;

FIG. 8B is a side cross-sectional view of the parking actuator assembly of FIG. 8A in an out-of-park position, according to the principles of the present disclosure;

FIG. 9C is a plan view of the parking actuator assembly of FIGS. 9A-9C in an in-park position, in accordance with the principles of the present disclosure.

DETAILED DESCRIPTION

Figure 2A:
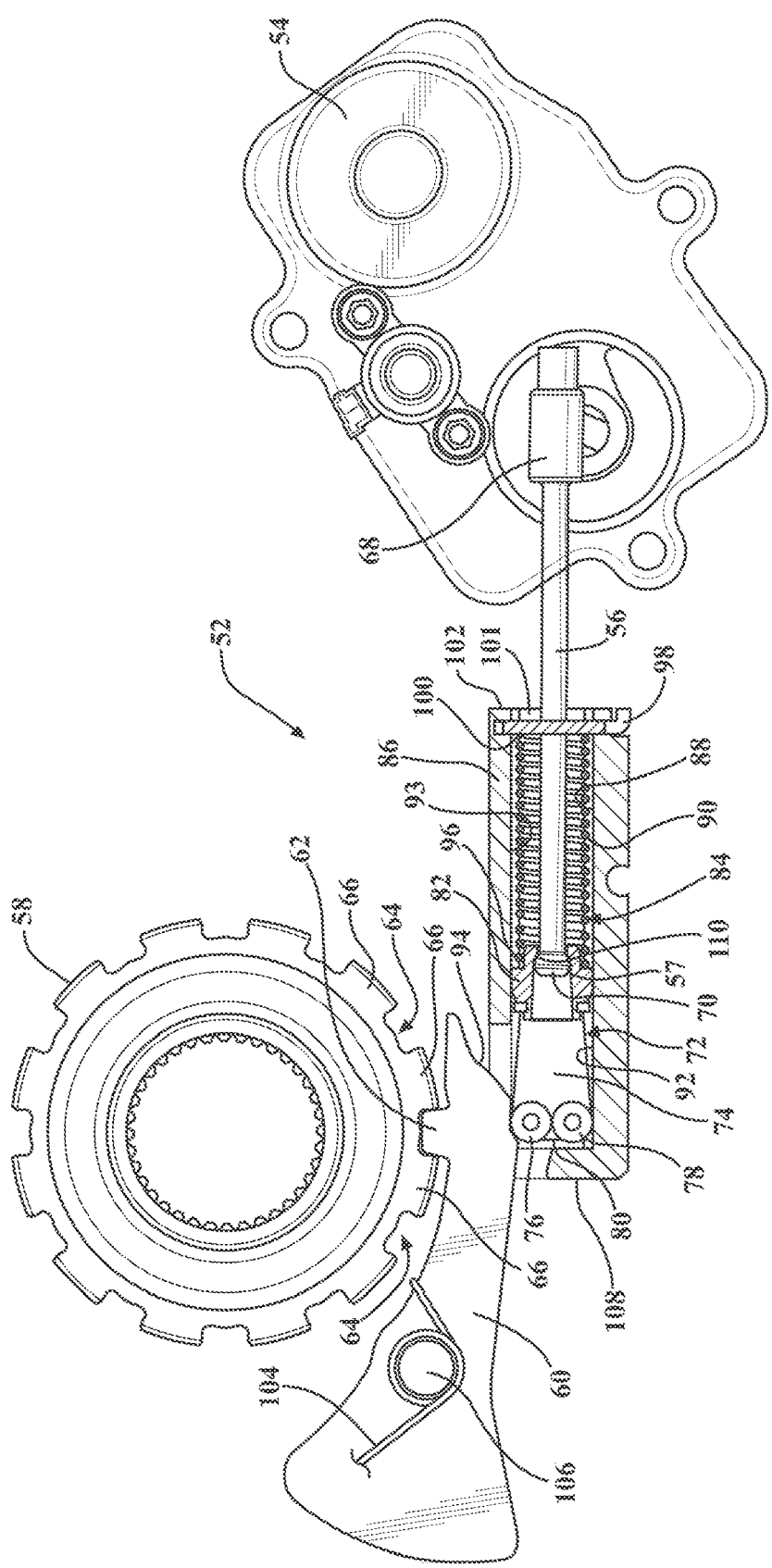
FIG. 2A is a side cross-sectional view of an exemplary parking actuator assembly for the propulsion system of FIG. 1 in an in-park position, according to the principles of the present disclosure.

With reference to FIG. 1, a motor vehicle is illustrated and generally indicated by reference number 20. The vehicle 20 is illustrated as a passenger car, but it should be appreciated that the vehicle 20 may be any type of vehicle, such as a truck, van, sport-utility vehicle, etc. The vehicle 20 includes an exemplary propulsion system 22. It should be appreciated at the outset that while a rear-wheel drive propulsion system 22 has been illustrated, the vehicle 20 may have a front-wheel drive propulsion system without departing from the scope of the present disclosure. The propulsion system 22 generally includes a prime mover 24 interconnected with a transmission 26.

The prime mover 24 may be a conventional internal combustion engine or an electric engine, hybrid engine, or any other type of prime mover, by way of example. The prime mover 24 supplies a driving torque to the transmission 26, for example, through a flex plate 28 or other connecting device that is connected to a starting device 30. The starting device 30 may be a hydrodynamic device, such as a fluid coupling or torque converter, a wet dual clutch, or an electric motor. It should be appreciated that any starting device between the prime mover 24 and the transmission 26 may be employed, including a dry launch clutch.

The transmission 26 may have a cast, metal housing 32 which encloses and protects the various components of the transmission 26. The housing 32 may include a variety of apertures, passageways, shoulders and flanges which position and support these components. By way of example, the transmission 26 includes a transmission input shaft 34 and a transmission output shaft 36. The transmission input shaft 34 is functionally interconnected with the engine 24 via the starting device 30 and receives input torque or power from the engine 24. Accordingly, the transmission input shaft 34 may be a turbine shaft in the case where the starting device 30 is a hydrodynamic device, dual input shafts where the starting device 30 is dual clutch, or a drive shaft where the starting device 30 is an electric motor. The transmission output shaft 36 may be connected with a final drive unit 38 which includes, for example, a prop shaft 40, a differential 42, and drive axles 44 connected to wheels 46.

The transmission 26 includes a gear and clutch arrangement 48, which may include, for example, a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 48, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 48, and shafts within the transmission 26 may vary without departing from the spirit and scope of the present disclosure.

The transmission 26 is controlled by a main transmission control module 50. The main transmission control module 50 is preferably an electronic control device having a preprogrammed digital computer or processor, control logic or circuits, memory used to store data, and one or more I/O peripherals. The control logic includes or enables a plurality of logic routines for monitoring, manipulating, and generating data and control signals. In another example, the main transmission control module 50 may be incorporated into an engine control module (ECM), or a hybrid control module, or any other type of controller.

FIG. 1 also shows a schematic representation of a parking actuator assembly 52, which may be positioned at least partially within the transmission housing 32 and in communication with the main transmission control module 50.

Referring now generally to FIGS. 2A through 7B, a first example of a parking actuator assembly 52 in accordance with the present disclosure is described. The parking actuator assembly 52 includes an actuator motor 54 operable to drive an actuator rod 56. A park gear 58 may be locked into park when a park pawl 60 is in an in-park position (as shown in FIGS. 2A-2B). More specifically, when a locking tooth 62 of the park pawl 60 engages a recess 64 between teeth 66 of the park gear 58, the park pawl 60 is in the in-park position and park gear 58 is locked into park, as shown in FIGS. 2A-2B.

The actuator rod 56 defines a proximal end 68 that is rotatably coupled to the actuator motor 54, and a distal end 70. The distal end 70 of the actuator rod 56 is slidably coupled to an actuator assembly 72. The actuator assembly 72, in this example, has a body portion 74 with a first roller 76 and a second roller 78 rotatably attached to the body portion 74 at a distal end 80 of the body portion 74, and a round bullet end 82 is attached to a proximal end 84 of the actuator assembly 72. The actuator rod 56 is, more particularly, slidably connected to the round bullet end 82. The first and second rollers 76, 78 may be configured to contact and roll against the surfaces of each other.

A guide 86 is disposed about the actuator assembly 72 and the distal end 70 of the actuator rod 56. The guide 86 may have a generally rectangular cross-section, by way of example, that defines a hollow interior space 88. The actuator assembly 72 and a coil spring 90 are disposed within the hollow interior space 88 of the guide 86. The guide 86 defines an interior planar surface 92 along which the second roller 78 is configured to roll. The round bullet end 82 is in sliding contact with one or more interior surfaces 92, 93 of the guide 86. The park pawl 60 defines a ramped surface 94 along which the first roller 76 is configured to roll.

The spring 90 is disposed in the interior hollow space 88 of the guide 86 adjacent to the round bullet end 82. The spring 90, in this example, is disposed about the actuator rod 56, and the spring 90 is in contact with the round bullet end 82 at a first end 96 of the spring 90. The spring 90 contacts either a proximal end 102 of the guide 86 or an attachment to the guide 86, such as a retainer clip 98, at a proximal end 100 of the spring 90. The actuator rod 56 extends from the round bullet end 82, through an interior of the coil spring 90, and out of an opening 101 in the proximal end 102 of the guide 86. In this example, the spring 90 is detached from the actuator rod 56, the guide 86, and the actuator assembly 72. The spring 90 provides a biasing force between the actuator 72, and, in this example, the retainer clip 98. Therefore, in the orientation of FIGS. 2A-2B, the spring 90 is configured to bias the actuator assembly 72 to the left.

Figure 2B:
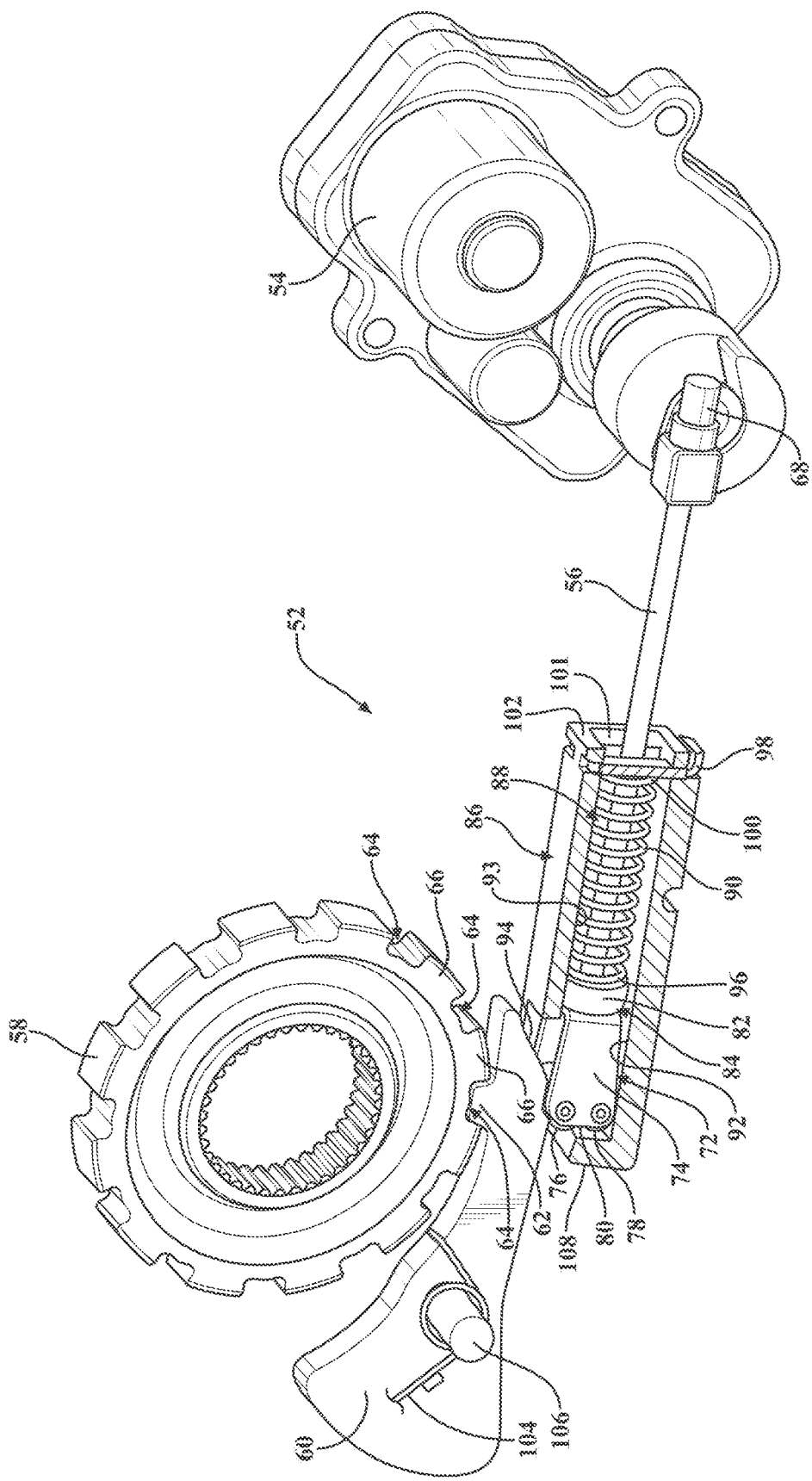
FIG. 2B is a perspective view of the parking actuator assembly of FIG. 2A in the in-park position, in accordance with the principles of the present disclosure.
Figure 3:
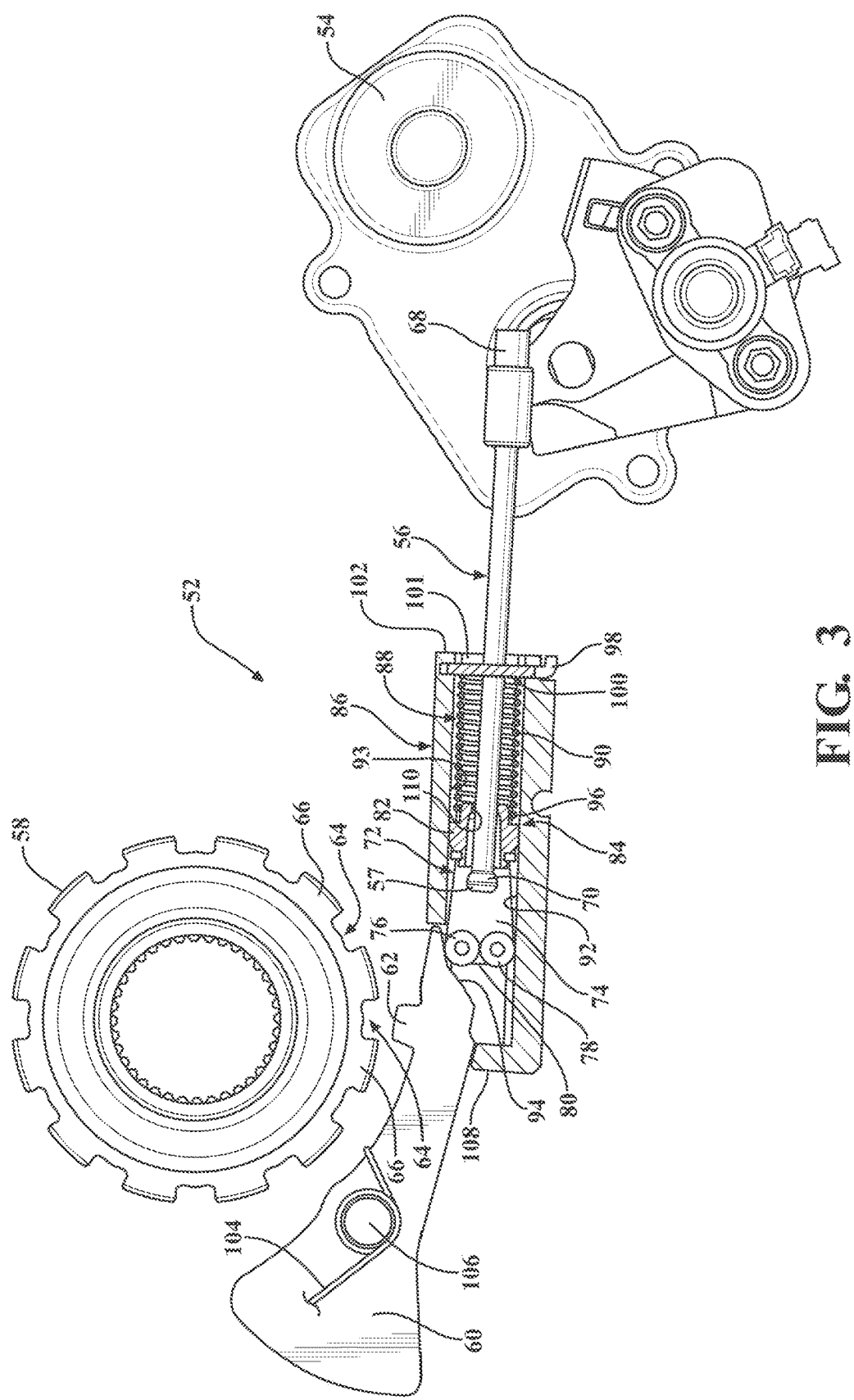
FIG. 3 is a side cross-sectional view of the parking actuator assembly of FIGS. 2A-2B in a ratcheting or intermediate position, according to the principles of the present disclosure.
Figure 4A:
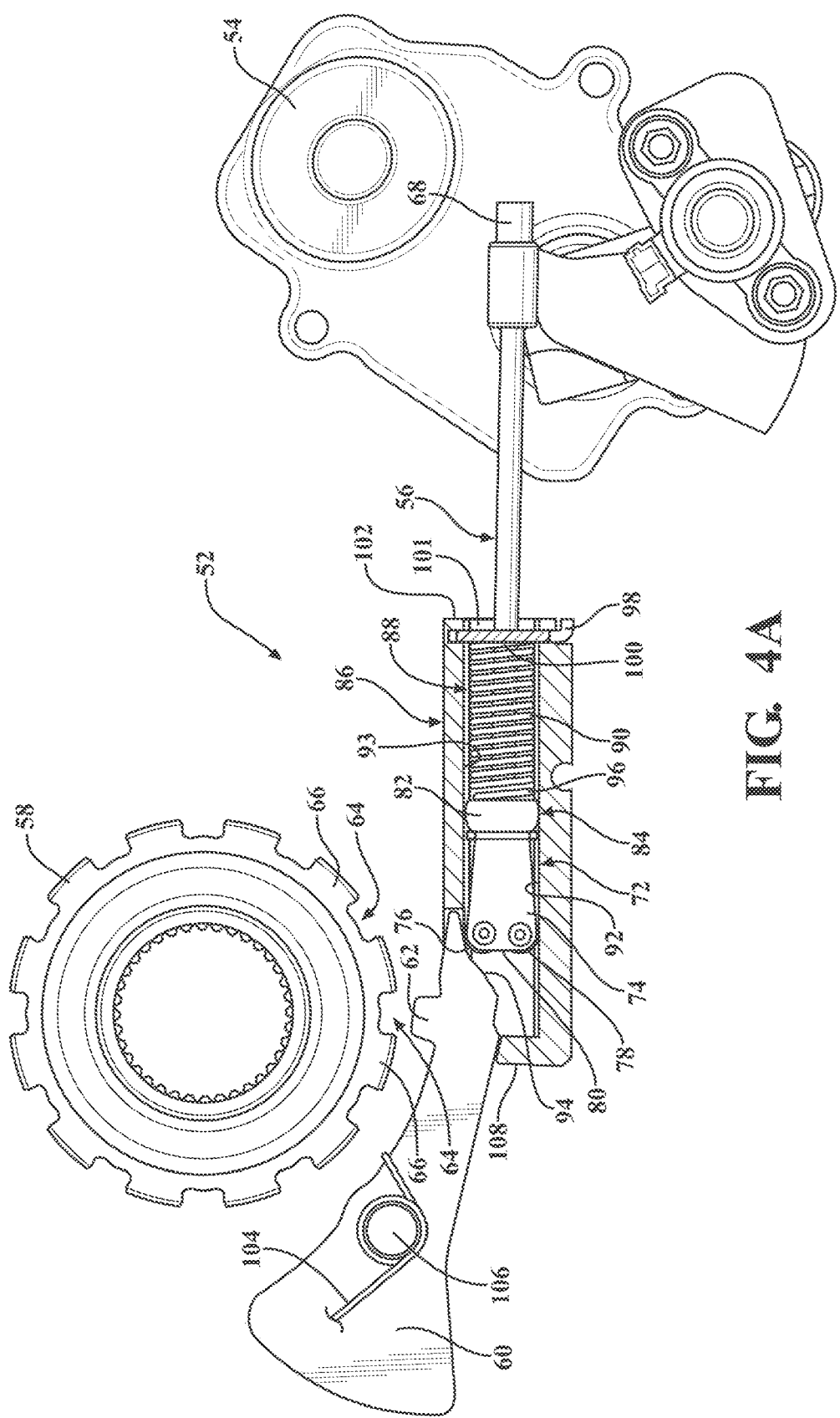
FIG. 4A is a side cross-sectional view of the parking actuator assembly of FIGS. 2A-3 in an out-of-park position, in accordance with the principles of the present disclosure.
Figure 4B:
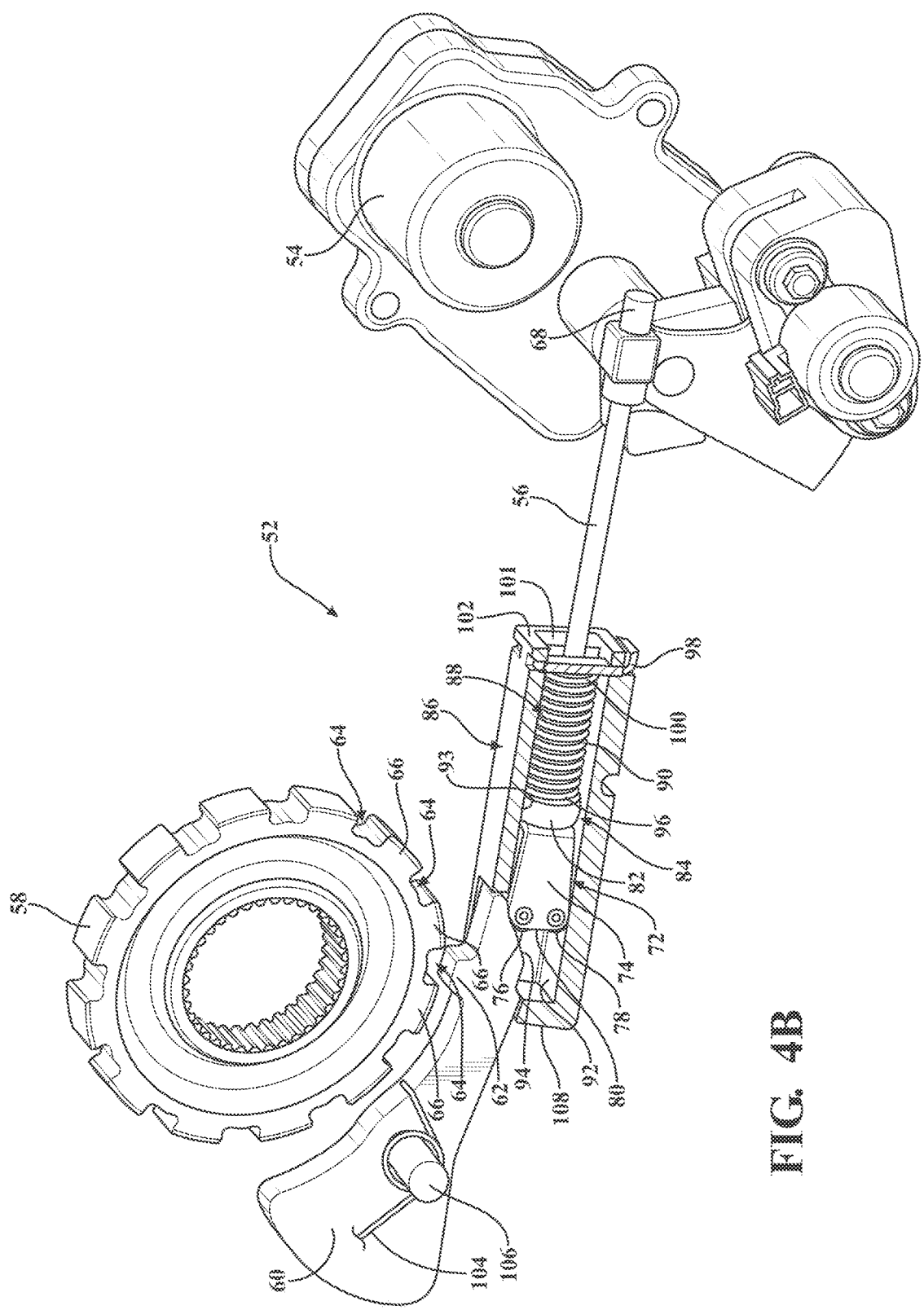
FIG. 4B is a perspective view of the parking actuator assembly of FIGS. 2A-4A in the out-of-park position, in accordance with the principles of the present disclosure.
Figure 5:
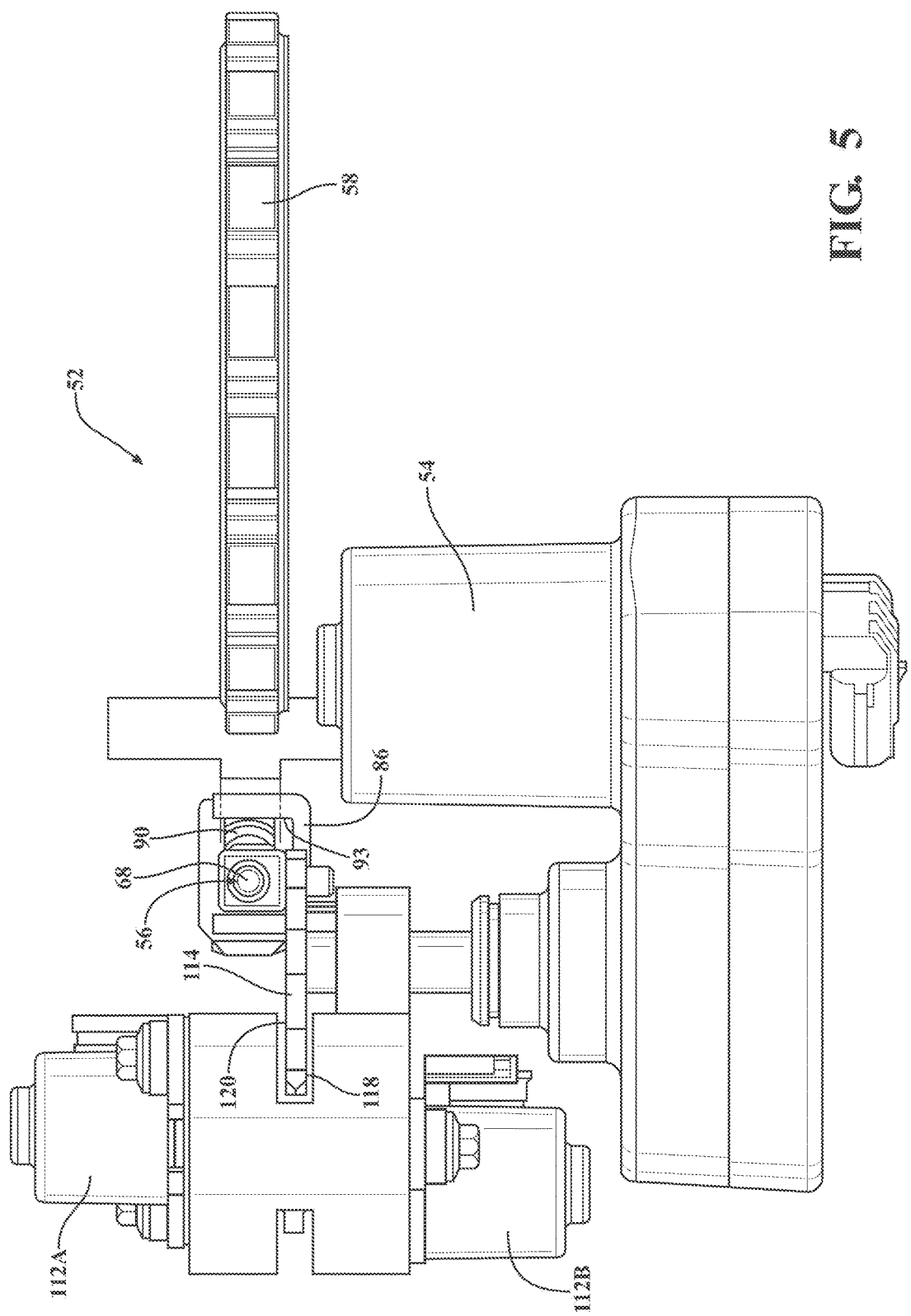
FIG. 5 is a plan view of the parking actuator assembly of FIGS. 2A-4B, according to the principles of the present disclosure.
Figure 7A:
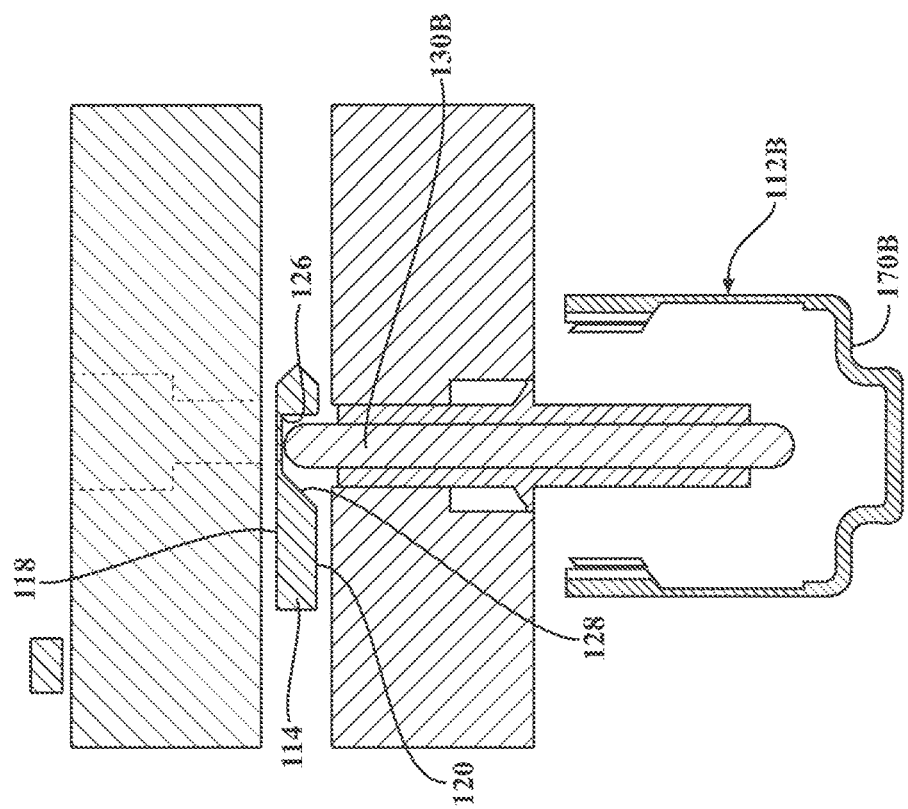
FIG. 7A is a cross-sectional view of a portion of the parking actuator assembly of FIGS. 2A-6B showing a first solenoid, in accordance with the principles of the present disclosure.
Figure 7B:
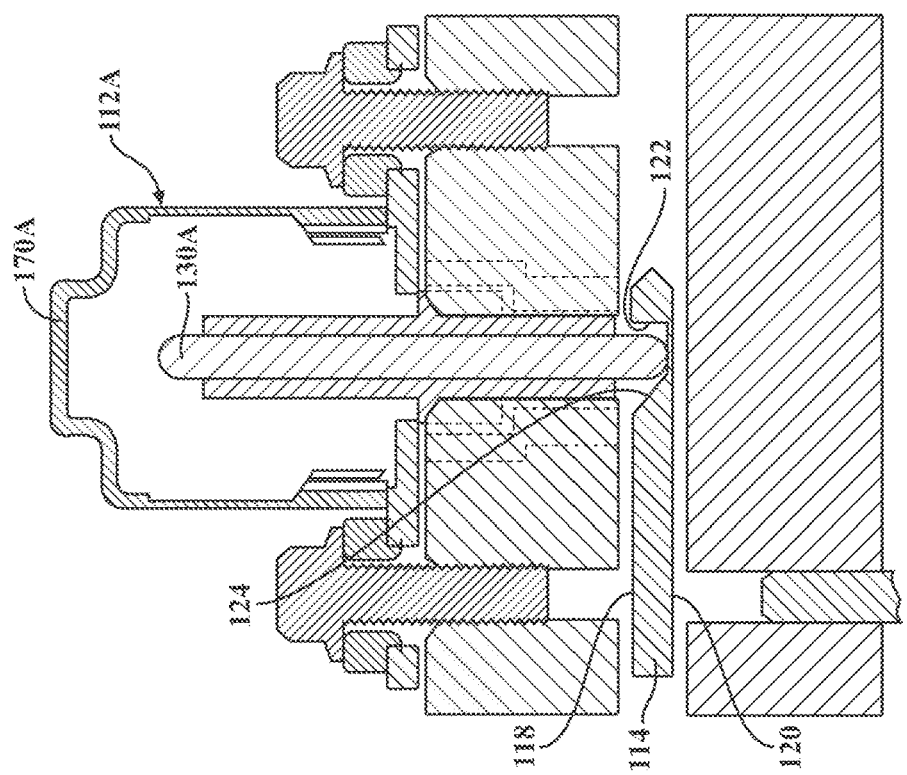
FIG. 7B is a cross-sectional view of a portion of the parking actuator assembly of FIGS. 2A-7A showing a second solenoid, in accordance with the principles of the present disclosure.

The actuator assembly 72 is configured to move between a park-actuated position and a park-disengaged position. In the illustrated example, the actuator assembly 72 moves linearly from the park-actuated position to the park-disengaged position. In the park-actuated position, the actuator assembly 72 is disposed as shown in FIGS. 2A-2B, pushing the park pawl 60 into contact with the park gear 58. The spring 90 biases the actuator assembly 72 into the park-actuated position. In the park-disengaged position, the actuator assembly 72 is moved to the right, as shown in FIGS. 3, 4A, and 4B. When the actuator assembly 72 is moved into the park-disengaged position, the actuator assembly 72 no longer pushes the park pawl 60 into contact with the park gear 58, and therefore, a spring 104 of the park pawl 60 biases the park pawl 60 rotatably about the park pawl pin 106 away from the park gear 58.

The parking actuator assembly 52 is configured to be in the in-park, or park, position by default. The spring 104 of the park pawl 60 biases the park pawl 60 into the out-of-park position, wherein the park pawl tooth 62 is disengaged from the park gear 58; however, the spring 90 within the guide 86 biases the actuator assembly 72 toward the distal end 108 of the guide 86 (to the left in the orientation of FIGS. 2A-2B), causing the actuator assembly 72 to push the park pawl 60 so that the park pawl 60 pivots toward the park gear 58 and engages the park gear 58. Thus, absent an intervening force, the spring 90 biases the actuator assembly 72 against the park pawl 60 to cause the park pawl 60 to engage the park gear 58.

The actuator motor 54 is operable to move the proximal end 68 of the actuator rod 56 away from the guide 86 (to the right in the orientation of FIGS. 2A-4B). The distal end 70 of the actuator rod 56 has a lip portion 57 preventing the actuator rod 56 from escaping out of the round bullet end 82. As the proximal end 68 of the actuator rod 56 is moved away from the guide 86, the lip portion 57 on the distal end 70 of the actuator rod 56 pulls the actuator assembly 72 into the park-disengaged position against the spring 90. Referring to FIGS. 4A-4B, when the actuator assembly 72 in the park-disengaged position, the park pawl 60 pivots on the pivot pin 106 to the out-of-park position by virtue of the force in the park pawl spring 104 because the actuator assembly 72 is no longer pushing the park pawl 60 into engagement with the park gear 58.

The actuator rod 56 is slidingly connected to the actuator assembly 72. The actuator motor 54 is operable to move the proximal end 68 of the actuator rod 56 toward and away from the guide 86. Referring to FIG. 3, an intermediate or ratcheting position of the parking actuator assembly 52 is shown. As the actuator motor 54 moves the proximal end 68 of the actuator rod 56 back toward the guide 86, the actuator rod 56 slides within an opening 110 formed within the round bullet end 82 of the actuator assembly 72. As the distal end 70 and lip portion 57 of the actuator rod 56 is moved by the actuator motor 54 within the round bullet end 82 toward the distal end 108 of the guide 86, the round bullet end 82 is no longer held into the park-disengaged position of the actuator assembly 72 by the distal end 70 of the actuator rod 56. Thus, the spring 90 begins to push the actuator assembly 72 toward the distal end 108 of the guide 86. FIG. 3 shows an intermediate position of the actuator assembly 72 wherein the rod 56 has begun to be pushed toward the distal end 108 of the guide 86, but the actuator assembly 72 has not yet moved by virtue of the spring force 90 into the park-engaged position to push the park pawl 60 into the in-park position. The actuator assembly 72 may also be in the intermediate position when the actuator assembly 72 is ratcheting, which will be explained in further detail below.

Thus, as shown in FIGS. 2A-2B, absent power or an intervening force, the spring 90 biases the actuator assembly 72 into the park-actuated position. The motor 54 is operable to move the actuator rod 56 so that the actuator rod 56 pulls the actuator assembly 72 into the park-disengaged position, as shown in FIGS. 4A-4B.

The ramped surface 94 of the park pawl 60 is disposed in rolling contact with the first roller 76 of the actuator assembly 72. At all positions of the actuator assembly 72, the park pawl 60 remains in contact with the first roller 76. Thus, the first roller 76 contacts the park pawl 60 in the park-actuated position and in the park-disengaged position of the actuator assembly 72.

Similarly, the guide 86 is disposed in rolling contact with the second roller 78 of the actuator assembly 72. The second roller 78 rolls along the generally planar interior surface 92 of the guide 86 between the park-actuated position and the park-disengaged position. Thus, at all positions of the actuator assembly 72, the planar interior surface 92 of the guide 86 remains in contact with the second roller 78. The second roller 78 contacts the planar surface 92 of the guide 86 in the park-actuated position and in the park-disengaged position and is configured to roll along the internal planar surface 92 from the park-actuated position to the park-disengaged position.

The guide 86 has planar surfaces 92, 93, and the only ramped surface contacted by any of the rollers 76, 78 of the actuator assembly 72 is the ramped surface 94 of the park pawl 60. This results in a stable movement of the actuator assembly 72 during engagement, disengagement, and ratcheting of the park gear 58.

Referring now to FIGS. 5-7B, and with continued reference to FIGS. 2A-4B, the parking actuator assembly 52 includes at least one solenoid 112A, 112B configured to latch the position of the actuator rod 56. In this example, first and second solenoids 112A, 112B are each operable to latch the actuator rod 56, and thus the park pawl 60, into the out-of-park position. The solenoids 112A, 112B may also be operable to latch the actuator rod 56, and thus the park pawl 60, into the in-park position, if desired.

In the illustrated example, a park lever 114 is rotatably attached to the proximal end 68 of the actuator rod 56. The park lever 114 is directly or indirectly coupled to the actuator motor 54. In this example, the park lever 114 is connected to the actuator motor 54 through one or more gears 116 (only one gear 116 can be seen in the figures, but it should be understood that multiple gears 116 are used to meshingly couple the motor 54 to the park lever 114. The actuator motor 54 is operable to rotate the gears 116, and therefore, to rotate the park lever 114 to move the actuator rod 56 with respect to the guide 86.

The park lever 114 has a first face 118 and a second face 120 opposed to the first face 118. The first face 118 defines a first ramped slot 122 having a ramp 124, and the second face 120 defines a second ramped slot 126 having a ramp 128. In this example, each solenoid 112A, 112B is disposed adjacent to a face 118, 120 of the park lever 114. Each solenoid 112A, 112B has a solenoid plunger 130A, 130B, wherein each solenoid 112A, 112B is configured to actuate its respective solenoid plunger 130A, 130B to latch the park lever 114. For example, upon energization of each solenoid 112A, 112B, its respective plunger 130A, 130B is moved out of a respective solenoid housing 170A, 170B toward the park lever 114 and into a slot of the park lever 114 if the plunger 130A, 130B is lined up with a slot when actuated.

The first solenoid plunger 130A is actuated and disposed in the first ramped slot 122 to latch the park lever 114, and the second solenoid plunger 130B is disposed in the second ramped slot 126 to latch the park lever 114 into an out-of-park position. When the park lever 114 is latched in the first and/or second ramped slots 122, 126 by one of both solenoid plungers 130A, 130B, the actuator rod 56 is held in a first position corresponding to the park-disengaged position of the actuator assembly 72. Thus, the solenoid plungers 130A, 130B latch the park lever 114 to hold the proximal end 68 of the actuator rod 56 in a position farther from from the distal end 108 of the guide 68 than when the actuator assembly is in the park-actuated position, therefore, also holding the actuator assembly 72 in the park-disengaged position and the park gear 58 in the out-of-park position. The solenoids 112A, 112B are redundant so that if one fails or loses power, the other of the solenoids 112A, 112B is still operable to latch the assembly 52 out of park.

When it is desired to move the parking actuator assembly 52 into park, the solenoids 112A, 112B are deenergized, and the actuator motor 54 is configured to cause rotation of the park lever 114. As a force is applied by the actuator motor 54 to rotate the park lever 114, the ramps 124, 128 push the deenergized solenoid plungers 130A, 130B out of the respective slots 122, 126. The actuator motor 54 causes rotation of the park lever 114 to move the actuator rod 56 toward the distal end 108 of the guide 86. The spring 90 then biases the actuator assembly 72 toward the distal end 108 of the guide 86, which pushes the park pawl 60 into engagement with the park gear 58.

If desired, each of the solenoids 112A, 112B can be configured to latch its respective plunger 130A, 130B in the park-actuated position of the actuator assembly 72 and the corresponding in-park position of the park pawl 60. For example, the park lever 114 could define a third ramped slot 132 in the first face 118 and a fourth ramped slot 134 in the second face 120. The first solenoid plunger 130A is disposed in the third ramped slot 132 to latch the park lever 114 to hold the actuator assembly 72 in the park-actuated position, and the second solenoid plunger 130B is disposed in the fourth ramped slot 134 to latch the park lever 114 to hold the actuator assembly 72 in the park-actuated position. Again, the solenoids 112A, 112B are redundant so that if one fails or loses power, the other of the solenoids 112A, 112B would still be operable to latch the assembly 52 into park.

The park lever 114 is movable between a first position corresponding to the park-actuated position of the actuator assembly 72 and a second position corresponding to the park-disengaged position of the actuator assembly 72. The parking actuator assembly 52 may also include a verification sensor 136 disposed adjacent to the park lever 114, where the verification sensor 136 is configured to determine a position of the park lever 114. The verification sensor 136 is configured to determine whether the park lever 114 is in the first or second position, and thus, whether the system is in park of out of park, because the first and second positions of the park lever 114 may correspond to the park-actuated and park-disengaged positions of the actuator assembly 72, respectively. One or more positive stops (not shown) may be provided in adjacent structure to limit the motion of the park lever 114 beyond the desired position(s).

Referring now to FIGS. 8A-8B, a schematic illustration is provided of another example of a parking actuator assembly 252. The parking actuator assembly 252 may be similar to the parking actuator assembly 52 described above, except where described as being different. For example, the parking actuator assembly 252 includes an actuator motor 254 operable to drive an actuator rod 256. A park gear 258 may be locked into park when a park pawl 260 is in an in-park position (as shown in FIG. 8A).

The actuator rod 256 defines a proximal end 268 that is rotatably coupled to the actuator motor 254 and a distal end 270 slidably coupled to an actuator assembly 272. The actuator assembly 272, in this example, has a body portion 274 with a first roller 276, a second roller 278, a third roller 350, and a fourth roller 352. Each of the rollers 276, 278, 350, 352 is rotatably attached to the body portion 274. The first and second rollers 276, 278 are rotatably attached to the body portion 274 at a distal end 280 of the body portion 274, and the third and fourth rollers 350, 352 are rotatably attached to the body portion 274 at a mid-section 354 of the body portion 274. Thus, the first roller 276 is spaced apart from the third roller 350, and the second roller 278 is spaced apart from the fourth roller 352. The first and second rollers 276, 278 may be configured to contact and roll against the surfaces of each other, and the third and fourth rollers 350, 352 may be configured to contact each other and roll against the surfaces of each other.

The actuator rod 256 is slidably connected to a proximal end 356 of the body portion 274, which may include a round bullet end as shown in FIGS. 2A-4B, if desired. The body portion 274 (or an attached structure, such as a round bullet end) defines an opening 358 through which the actuator rod 256 is slidably received, and the actuator rod 256 has a lipped end 257 preventing the actuator rod 256 from sliding out of the body portion 274.

A guide 286 is disposed about the actuator assembly 272 and the distal end 270 of the actuator rod 256. The guide 286 may have a generally rectangular cross-section, by way of example, that defines a hollow interior space 288. The actuator assembly 272 and a coil spring 290 are disposed within the hollow interior space 288 of the guide 286. The guide 286 defines a first interior planar surface 292 along which the second roller 278 and the fourth roller 352 are configured to roll. The guide 286 further defines a second interior planar surface 293 along which the third roller 350 is configured to roll. The park pawl 260 defines a ramped surface 294 along which the first roller 276 is configured to roll.

The spring 290 is disposed in the interior hollow space 288 of the guide 286 between the actuator assembly 272 and a proximal end 302 of the guide 286. The spring 290, in this example, is disposed about the actuator rod 256, and the spring 290 is in contact with the actuator assembly 272 at a first end 296 of the spring 290. The spring 290 contacts either the proximal end 302 of the guide 286 or an attachment to the guide 286, such as a retainer clip 98 (shown in FIGS. 2A-5), at a proximal end 300 of the spring 290. The actuator rod 256 extends from the actuator assembly 272, through an interior of the coil spring 290 and out of an opening 301 in the proximal end 302 of the guide 286. In this example, the spring 290 is detached from the actuator rod 256, the guide 286, and the actuator assembly 272. The spring 290 provides a biasing force between the actuator assembly 272 and the proximal end 302 of the guide 286. Therefore, in the orientation of FIGS. 8A-8B, the spring 290 is configured to bias the actuator assembly 272 to the left.

The actuator assembly 272 is configured to move between a park-actuated position and a park-disengaged position, in a linear motion. In the park-actuated position, the actuator assembly 272 is disposed as shown in FIG. 8A, pushing the park pawl 260 into contact with the park gear 258. The spring 290 biases the actuator assembly 272 into the park-actuated position. In the park-disengaged position, the actuator assembly 272 is moved to the right axially, as shown in FIG. 8B. When the actuator assembly 272 is moved into the park-disengaged position, the actuator assembly 272 no longer pushes the park pawl 260 into contact with the park gear 258, and therefore, a spring 304 of the park pawl 260 biases the park pawl 260 rotatably about the park pawl pin 306 away from the park gear 258.

The parking actuator assembly 252 is configured to be in the in-park or park positions by default. The spring 304 of the park pawl 260 biases the park pawl 260 into the out-of-park position, wherein the park pawl tooth 262 is disengaged from the park gear 258; however, the spring 290 within the guide 286 biases the actuator assembly 272 toward the distal end 308 of the guide 286 (to the left in the orientation of FIGS. 8A-8B), causing the actuator assembly 272 to push the park pawl 260 so that the park pawl 260 pivots toward the park gear 258 and engages the park gear 258, similar to what is shown in FIGS. 2A-4B. Thus, absent an intervening force, the spring 290 biases the actuator assembly 272 against the park pawl 260 to cause the park pawl 260 to engage the park gear 258.

The actuator motor 254 is operable to move the proximal end 268 of the actuator rod 256 away from the guide 286 (to the right in the orientation of FIGS. 8A-8B). As the proximal end 268 of the actuator rod 256 is moved away from the guide 286, the distal end 270 of the actuator rod 256 pulls the actuator assembly 272 into the park-disengaged position against the force of the spring 290, as shown in FIG. 8B. When the actuator assembly 272 is in the park-disengaged position, the park pawl 260 pivots on the pivot pin 306 to the out-of-park position by virtue of the force in the park pawl spring 304 because the actuator assembly 272 is no longer pushing the park pawl 260 into engagement with the park gear 258.

The actuator rod 256 is slidingly connected to the actuator assembly 272. The actuator motor 254 is operable to move the proximal end 268 of the actuator rod 256 toward and away from the guide 286. Referring to FIG. 8A, as the actuator motor 254 moves the proximal end 268 of the actuator rod 256 back toward the guide 286, the actuator rod 256 slides within the opening 358 formed within the proximal end 356 of the actuator assembly 272 (or an attachment thereto). As the distal end 270 of the actuator rod 256 is moved by the actuator motor 254 within the guide 286 toward the distal end 308 of the guide 286, the actuator assembly 272 is no longer held into the park-disengaged position of the actuator assembly 272 by the lipped end 257 on the distal end 270 of the actuator rod 256. Thus, the spring 290 pushes the actuator assembly 272 toward the distal end 308 of the guide 286.

Therefore, as shown in FIG. 8A, absent power or an intervening force, the spring 290 biases the actuator assembly 272 into the park-actuated position. The motor 254 is operable to move the actuator rod 256 so that the actuator rod 256 pulls the actuator assembly 272 into the park-disengaged position, as shown in FIG. 8B.

The ramped surface 294 of the park pawl 260 is disposed in rolling contact with the first roller 276 of the actuator assembly 272. At all positions of the actuator assembly 272, the park pawl 260 remains in contact with the first roller 276. Thus, the first roller 276 contacts the park pawl 260 in the park-actuated position and in the park-disengaged position of the actuator assembly 272.

Similarly, the guide 86 is disposed in rolling contact with the second roller 278, the third roller 350, and the fourth roller 352 of the actuator assembly 272. The second roller 278 and the fourth roller 352 each roll along the generally planar interior surface 292 of the guide 286 between the park-actuated position and the park-disengaged position. Thus, at all positions of the actuator assembly 272, the planar interior surface 292 of the guide 286 remains in contact with the second roller 278 and with the fourth roller 352. The second roller 278 and the fourth roller 352 each contact the guide 286 in the park-actuated position and in the park-disengaged position, and each is configured to roll along the internal planar surface 292 from the park-actuated position to the park-disengaged position.

The third roller 350 rolls along another generally planar interior surface 293 of the guide 286 between the park-actuated position and the park-disengaged position. Thus, at all positions of the actuator assembly 272, the planar interior surface 293 of the guide 286 remains in contact with the third roller 350. The third roller 350 contacts the guide 286 in the park-actuated position and in the park-disengaged position and is configured to roll along the internal planar surface 293 from the park-actuated position to the park-disengaged position. With multiple sets of rollers 276, 278, 350, 352, the actuator assembly 272 moves stably within the guide 286. Moreover, since the guide 286 has planar surfaces 292, 293, and the only ramped surface contacted by any of the rollers 276, 278, 350, 352 of the actuator assembly 272 is the ramped surface 294 of the park pawl 260, the result is a stable axial, linear movement of the actuator assembly 272 during engagement, disengagement, and ratcheting of the park gear 258.

The parking actuator assembly 252 includes at least one solenoid 312A, 312B that is configured to latch the position of the actuator assembly 272. In this example, first and second solenoids 312A, 312B are each operable to latch the actuator rod 256, the actuator assembly 272, and thus the park pawl 260, into the out-of-park position; however, it should be understood that a single solenoid 312A, 312B could alternatively be used. The solenoids 312A, 312B may also be operable to latch the actuator rod 256, and thus the park pawl 260, into the in-park position, if desired.

In the illustrated example, a park lever 314 is schematically illustrated, and it should be understood that the park lever 314 could be similar to the park lever 114 described above, if desired. The park lever 314 is rotatably attached to the proximal end 268 of the actuator rod 256. The park lever 314 is directly or indirectly coupled to the actuator motor 254, for example, through one or more gears (not shown). The park lever 314 has a first face 318 and a second face 320 opposed to the first face 318. The first face 318 and the second face 320 may each define slots, similar to the slots 122, 126 described above, if desired; or the park lever 314 may be formed without slots 122, 126.

Each solenoid 312A, 312B is disposed adjacent to a face 318, 320 of the park lever 314. Each solenoid 312A, 312B has a solenoid plunger 330A, 330B, wherein each solenoid 312A, 312B is configured to actuate its respective solenoid plunger 330A, 330B to latch the park lever 314. For example, upon energization of each solenoid 312A, 312B, its respective plunger 330A, 330B is moved outward toward the park lever 314 to latch the park lever 314.

The first solenoid plunger 330A may be disposed in a slot (not shown) of the park lever 314 or otherwise disposed adjacent to the park lever 314 to latch the park lever 314, and the second solenoid plunger 330B may be disposed in a slot (not shown) of the park lever 314 or otherwise disposed adjacent to the park lever 314 to latch the park lever 314. The park lever 314 may be latched by one of both solenoid plungers 330A, 330B, so that the actuator rod 256 and the park lever 314 are held in a first position corresponding to the park-disengaged position of the actuator assembly 272, as shown in FIG. 8B. In the example of FIG. 8B, the first solenoid plunger 330A extends adjacent to the second face 320 and the second solenoid plunger 330B extends adjacent to the first face 318 to latch the park lever 314. Thus, the solenoid plungers 330A, 330B latch the park lever 314 to hold the proximal end 268 of the actuator rod 256 in a position farther from the distal end 308 of the guide 268 than in a park-actuated position of the actuator assembly 272, therefore, also holding the actuator assembly 272 in the park-disengaged position and the park gear in the out-of-park position. The solenoids 312A, 312B are redundant so that if one fails or loses power, the other of the solenoids 312A, 312B is still operable to latch the assembly 252 out of park.

When it is desired to move the parking actuator assembly 352 into park, the solenoids 312A, 312B are deenergized, and the actuator motor 254 is configured to cause rotation of the park lever 314. As a force is applied by the actuator motor 254 to rotate the park lever 314, the deenergized solenoid plungers 330A, 330B retract. The actuator motor 254 causes rotation of the park lever 314 to move the actuator rod 256 toward the distal end 308 of the guide 286. The spring 290 then biases the actuator assembly 272 toward the distal end 308 of the guide 286 because the lipped end 257 no longer holds the actuator assembly 272 in the right-most position, which is the park-disengaged position. When the actuator assembly 272 is moved by the spring 290 into the park-activated position, the actuator assembly 272 pushes the park pawl 260 into engagement with the park gear 258.

If desired, each of the solenoids 312A, 312B may be further configured to latch its respective plunger 330A, 330B in the park-actuated position of the actuator assembly 272 and the corresponding in-park position of the park pawl 260. For example, as shown in FIG. 8A, the first solenoid plunger 330A extends adjacent to the first face 318 and the second solenoid plunger 330B extends adjacent to the second face 320 to latch the park lever 314 in the in-park position. Again, the solenoids 312A, 312B are redundant so that if one fails or loses power, the other of the solenoids 312A, 312B would still be operable to latch the assembly 252 into park.

The park lever 314 is movable between a first position (shown in FIG. 8A) corresponding to the park-actuated position of the actuator assembly 272 and a second position (shown in FIG. 8B) corresponding to the park-disengaged position of the actuator assembly 272. The parking actuator assembly 252 may also include a verification sensor 336 disposed adjacent to the park lever 314, where the verification sensor 336 is configured to determine a position of the park lever 314. The verification sensor 336 is configured to determine whether the park lever 314 is in the first or second position, and thus, whether the system is in park of out of park, because the first and second positions of the park lever 314 correspond to the park-actuated and park-disengaged positions of the actuator assembly 272, respectively. One or more positive stops (not shown) may be provided by adjacent structure to limit the motion of the park lever 314 beyond the desired position(s).

Figure 9A:
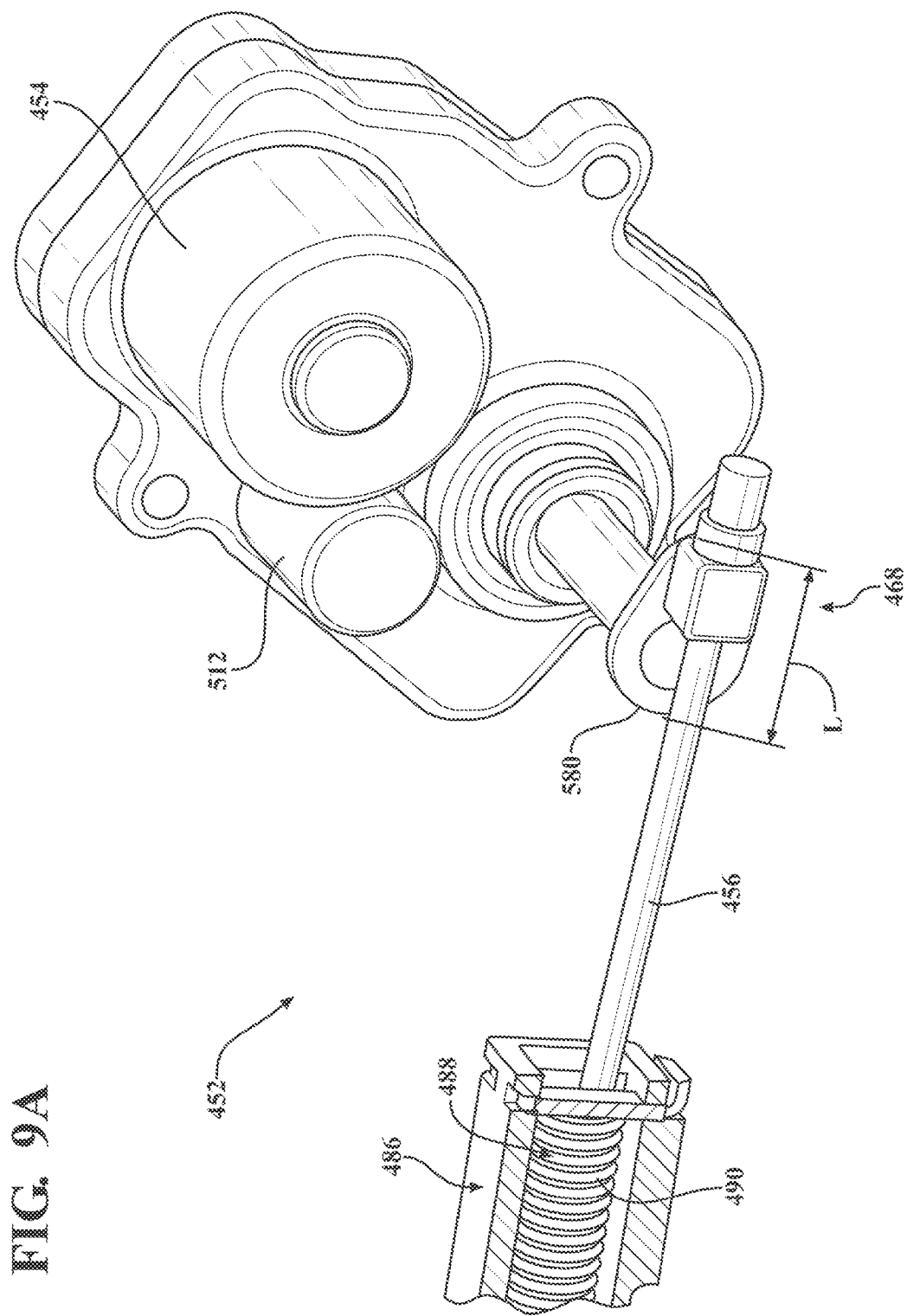
FIG. 9A is a perspective view of a portion of yet another exemplary parking actuator assembly that may be used with the propulsion system of FIG. 1 in an out-of-park position, according to the principles of the present disclosure.
Figure 9B:
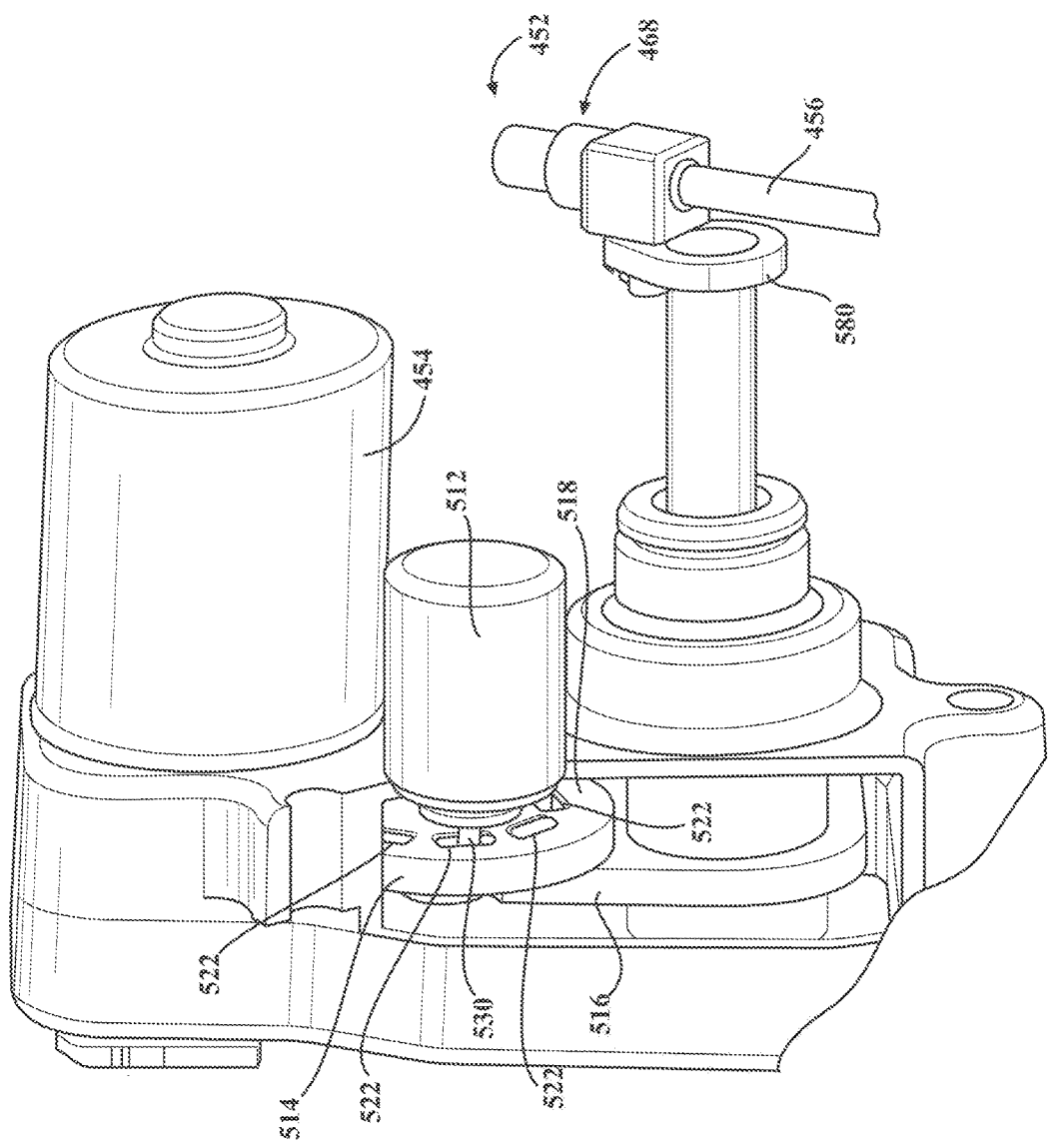
FIG. 9B is a cut-away perspective view of another portion of the parking actuator assembly of FIG. 9A in an out-of-park position, according to the principles of the present disclosure.

Referring now to FIGS. 9A-9C, another variation of a parking actuator assembly is illustrated and generally designated at 452. The parking actuator assembly 452 may be similar to one of the parking actuator assemblies 52, 252 described above, except where described as being different. For example, the parking actuator assembly 452 includes an actuator motor 454 operable to drive an actuator rod 456. A park gear 458 may be locked into park when a park pawl is in an in-park position. The park pawl is not visible in FIGS. 9A-9C, but it should be understood that the park pawl could operate and be configured similarly to as shown previously in one of FIGS. 2A-8B. Likewise, any other elements of the parking actuator assembly 252 not explicitly shown or described with respect to FIGS. 9A-9C may be similar to the elements shown previously.

The actuator rod 456 defines a proximal end 468 that is rotatably coupled to the actuator motor 354 via a bracket 580, and the actuator rod 456 is slidably coupled to an actuator assembly 472 (as previously described). A guide 486 is disposed about the actuator assembly 272 and a distal end of the actuator rod 456. The guide 486 may have a generally rectangular cross-section, by way of example, that defines a hollow interior space 488. The actuator assembly 472 and a coil spring 490 are disposed within the hollow interior space 488 of the guide 486. As previously described, the actuator assembly 472 is configured to move between a park-actuated position and a park-disengaged position to rotate the park pawl (not shown) between an in-park and an out-of-park position. The parking actuator assembly 452 is configured to be in the in-park or park positions by default.

The actuator motor 454 is operable to move the proximal end 468 of the actuator rod 456 away from the guide 486 (to the right in the orientation of FIG. 9A). As the proximal end 468 of the actuator rod 456 is moved away from the guide 486, the actuator rod 456 pulls the actuator assembly 472 into the park-disengaged position against the spring 490, as described above with respect to the actuator assemblies 52, 252 shown in the previous figures.

The actuator motor 254 is operable to move the proximal end 468 of the actuator rod 456 toward and away from the guide 486. In FIGS. 9A-9B, the proximal end 468 is shown in a top dead center range position away from the guide 486. In the top dead center range position, the bracket 580 is oriented with the direction of its longest length L being approximately parallel, or a few degrees (such as 1-5 degree) off of being parallel, to the guide 486. The top dead center range position corresponds to a park-disengaged position of the actuator assembly 472. In FIG. 9C, on the other hand, the proximal end 468 is in bottom dead center range position corresponding to the park-actuated position of the actuator assembly 472. A plurality of gears 516 may meshingly couple a park lever 514 and the proximal end 468 of the actuator rod 456 to the actuator motor 454. Absent power or an intervening force, the spring 490 biases the actuator assembly 472 into the park-actuated position. The motor 454 is operable to move the actuator rod 456 so that the actuator rod 456 pulls the actuator assembly 472 into the park-disengaged position.

In the example of FIGS. 9A-9C, the parking actuator assembly 452 includes a single solenoid 512 that is configured to latch the position of the actuator rod 456, and thus the park pawl (not shown), into the out-of-park position; however, it should be understood that a plurality of solenoids 512 could alternatively be used. The solenoid 512 may also be operable to latch the actuator rod 456, and thus the park pawl, into the in-park position, if desired.

In the illustrated example, the park lever 514 is rotatably attached to the proximal end 468 of the actuator rod 456 through the bracket 580. The park lever 514 is directly or indirectly coupled to the actuator motor 454, for example, through one or more gears 516. The park lever 514 has a face 518 that defines a plurality of slots 522. The solenoid 512 is disposed adjacent to the face 518 of the park lever 514. The solenoid 512 has a solenoid plunger 530, wherein the solenoid 512 is configured to actuate the solenoid plunger 530 to latch the park lever 514. For example, upon energization of the solenoid 512, the plunger 530 is moved outward toward the park lever 514 to latch the park lever 514.

The solenoid plunger 530 may be disposed in a slot 522 of the park lever 514 (or otherwise disposed adjacent to the park lever 514 as in the example of FIG. 8A) to latch the park lever 514 into a desired position. When the park lever 514 is latched by the solenoid plunger 530, the actuator rod 456 and the park lever 514 are held in a first position corresponding to the park-disengaged position of the actuator assembly 472, as shown in FIGS. 9A-9B. In the park-disengaged position, the proximal end 468 of the actuator rod 456 is in the top dead center range, resulting in a redundancy to hold the park-actuator assembly 472 in the park-disengaged position. Thus, the solenoid plunger 530 latches the park lever 514 and the motor 454 holds the proximal end 468 of the rod 456 in the top center range position to hold the actuator assembly 472 in the park-disengaged position and the park gear in the out-of-park position. The solenoid 512 and the motor 454 are redundant so that if one fails or loses power, the other is still operable to hold the parking actuator assembly 452 out of park. In other words, the combination of the actuator motor 454 being energized and the solenoid 512 being energized provides separate, independent, and redundant systems to maintain an out-of-park configuration. Failure by either the actuator motor 454 or the solenoid 512 will not result in the spring 490 moving the actuator rod 456 into a park position.

When it is desired to move the parking actuator assembly 452 into park, the solenoid 512 is deenergized, and the actuator motor 454 is configured to cause rotation of the park lever 514. As a force is applied by the actuator motor 454 to rotate the park lever 514, the deenergized solenoid plunger 530 retracts. The actuator motor 454 causes rotation of the park lever 514 to move the actuator rod 456 toward the distal end 508 of the guide 486 and toward the park gear 458. The spring 490 then biases the actuator assembly 472 toward the distal end 508 of the guide 486, which pushes the park pawl (not shown) into engagement with the park gear 458.

If desired, the solenoid 512 may be further configured to latch the plunger 530 in the park-actuated position of the actuator assembly 472 and the corresponding in-park position of the park pawl. For example, referring to FIG. 9B, the solenoid plunger 530 extends into a slot 122 of the face 518 to latch the park lever 514 in a second position, previously described as a park-disengaged position. In a park-actuated position, the park lever 514 is rotated, and the plunger 530 may extent into one of the other slots 122 corresponding to the park-actuated position to latch the park lever 514. Thus, the park lever 514 is movable between a second position (shown in FIG. 9B) corresponding to the park-disengaged position of the actuator assembly 472 and a first position corresponding to the park-actuated position of the actuator assembly 472. The parking actuator assembly 452 may also include a verification sensor (not shown) disposed adjacent to the park lever 514 to determine a position of the park lever 514.

In any of the variations of the parking actuator assembly 52, 252, 452, the spring 90, 290, 490 is a biasing member that is configured bias the actuator assembly 72, 272, 472 toward the distal end 108, 308, 508 of the guide 86, 286, 486 to provide a default-to-park function such that failure of any system or loss of power results in entry into the park configuration.

Additionally, the spring 90, 290, 490 may provide a ratcheting capability in those instances where the park gear 58, 258, 458 may be rotating at a speed above a predetermined speed such that immediate engagement of the pawl tooth with the park gear 58, 258, 458 is not desired. Only when the vehicle speed (and thus the rotation speed of the park gear 58, 258, 458) drops below a predetermined amount will the pawl tooth engage with the park gear 58, 258, 458. Prior to that speed being achieved, the pawl tooth "ratchets" along the park gear 58, 258, 458, and the spring 90, 290, 490 provides flexibility for the actuator assembly 72, 272, 472 to move to accommodate that ratcheting.

In some variations, the park actuator motor 54, 254, 454 and the solenoids 112A, 112B, 312A, 312B, 512 may be disposed within the main transmission system, significantly reducing the size of the overall system, improving packaging, reducing weight, and providing improved diagnostic abilities and control. Further, this new architecture removes access to a controller area network by a component which is external to the transmission system, thereby improving security of the overall system. Additionally, moving the functionality internally to the transmission 26 improves control, provides redundancy, and improves the ability to diagnose the system.

The foregoing description has been provided for purposes of illustration and description. It is not intended to be exhaustive or to limit the disclosure. Individual elements or features of a particular example are generally not limited to that example, but, where applicable, are interchangeable and can be used in another example, even if not specifically shown or described. The same may also be varied in many ways. Such variations are not to be regarded as a departure from the disclosure, and all such modifications are intended to be included within the scope of the disclosure.

What is claimed is:

1. A parking actuator assembly for an automatic transmission, the parking actuator assembly comprising:
    an actuator rod defining a distal end;
    an actuator assembly having a body portion and a first roller and a second roller rotatably attached to the body portion, the distal end of the actuator rod being slidably coupled to the actuator assembly;
    a guide disposed about the actuator assembly and the distal end of the actuator rod; and
    a park pawl disposed in rolling contact with the first roller, the park pawl being rotatable between an in-park position and an out-of-park position, the actuator assembly being configured to be moved between a park-actuated position and a park-disengaged position, the first roller contacting the park pawl in the park-actuated position and in the park-disengaged position.

2. The parking actuator assembly of claim 1, the second roller contacting the guide in the park-actuated position and in the park-disengaged position.

3. The parking actuator assembly of claim 2, the guide defining an internal planar surface, the second roller being configured to roll along the internal planar surface from the park-actuated position to the park-disengaged position.

4. The parking actuator assembly of claim 3, the first and second rollers being disposed at a distal end of the body portion, the actuator assembly further comprising a round bullet end disposed at a proximal end of the body portion, the round bullet end being in sliding contact with an interior surface of the guide, the actuator rod being slidably connected to the round bullet end, the actuator rod being configured to pull the actuator assembly into the park-disengaged position.

5. The parking actuator assembly of claim 4, further comprising a spring enclosed within the guide adjacent to the round bullet end, the spring being configured to bias the actuator assembly into the park-actuated position.

6. The parking actuator assembly of claim 5, further comprising a park lever rotatably attached to a proximal end of the actuator rod, the park lever being rotatable to move the actuator rod with respect to the guide.

7. The parking actuator assembly of claim 6, the spring being disposed about the actuator rod and in contact with the round bullet end, the spring being detached from the actuator rod and the guide.

8. The parking actuator assembly of claim 7, further comprising a solenoid disposed adjacent to the park lever, the solenoid having a solenoid plunger, the solenoid being configured to actuate the solenoid plunger to latch the park lever to hold the actuator assembly in the park-disengaged position.

9. The parking actuator assembly of claim 8, further comprising a park actuator motor configured to cause rotation of the park lever to move the actuator rod.

10. The parking actuator assembly of claim 9, the solenoid being a first solenoid and the solenoid plunger being a first solenoid plunger, the parking actuator assembly further comprising a second solenoid having a second solenoid plunger, the second solenoid being configured to actuate the second solenoid plunger to latch the park lever to hold the actuator assembly in the park-disengaged position.

11. The parking actuator assembly of claim 10, the park lever having a first face and a second face opposed to the first face, the first face defining a first ramped slot and the second face defining a second ramped slot, the first solenoid plunger being disposed in the first ramped slot to latch the park lever to hold the actuator assembly in the park-disengaged position, and the second solenoid plunger being disposed in the second ramped slot to latch the park lever to the hold the actuator assembly in the park-disengaged position.

12. The parking actuator assembly of claim 11, the first solenoid being further configured to actuate the first solenoid plunger to latch the park lever to hold the actuator assembly in the park-actuated position, and the second solenoid being further configured to actuate the second solenoid plunger to latch the park lever assembly to hold the actuator assembly in the park-actuated position, the park lever defining a third ramped slot in the first face, the first solenoid plunger being disposed in the third ramped slot to latch the park lever to hold the actuator assembly in the park-actuated position.

13. The parking actuator assembly of claim 12, further comprising a main transmission system, wherein each of the park actuator motor, the first solenoid, and the second solenoid are disposed within the main transmission system.

14. The parking actuator assembly of claim 12, the park lever being movable between a first position corresponding to the park-actuated position of the actuator assembly and a second position corresponding to the park-disengaged position of the actuator assembly, the parking actuator assembly further comprising a verification sensor disposed adjacent to the park lever and configured to determine a position of the park lever.

15. The parking actuator assembly of claim 14, the planar surface being a first planar surface, the first roller being located along a first side of the actuator assembly and the second roller being located along a second side of the actuator assembly, the actuator assembly further comprising a third roller located along the first side of the actuator assembly and a fourth roller located along the second side of the actuator assembly, the third roller being spaced apart from the first roller and the fourth roller being spaced apart from the second roller, the third and fourth rollers contacting the guide in the park-actuated position and in the park-disengaged position, the third roller being configured to roll along the first planar surface from the park-actuated position to the park-disengaged position, the guide further defining a second planar surface, the fourth roller being configured to roll along the second planar surface from the park-actuated position to the park-disengaged position.

16. The parking actuator assembly of claim 9, wherein the actuator assembly is held in the park-disengaged position by moving the park actuator motor into a top dead center range position and extending the solenoid plunger into a slot defined within a face of the park lever.

17. A parking actuator assembly for an automatic transmission, the parking actuator assembly comprising:
    a park pawl being rotatable between an in-park position and an out-of-park position;
    an actuator assembly configured to be moved between a park-actuated position and a park-disengaged position, the actuator assembly being configured to rotate the park pawl into the in-park position when the actuator assembly is moved into the park-actuated position;

an actuator rod defining a proximal end and a distal end, the distal end of the actuator rod being slidably coupled to the actuator assembly;

a guide disposed about the actuator assembly and the distal end of the actuator rod, the actuator assembly being movable within the guide;

a park lever rotatably attached to the proximal end of the actuator rod, the park lever being rotatable to move the actuator rod with respect to the guide, the park lever being rotatable between a first position corresponding to the park-actuated position of the actuator assembly and a second position corresponding to the park-disengaged position of the actuator assembly;

a park actuator motor configured to cause rotation of the park lever to move the actuator rod, the actuator rod being configured to pull the actuator assembly into the park-disengaged position by rotating the park lever; and a verification sensor disposed adjacent to the park lever and configured to determine a position of the park lever.

18. An automatic transmission assembly comprising:

a park pawl being rotatable between an in-park position and an out-of-park position;

an actuator assembly configured to be moved between a park-actuated position and a park-disengaged position, the actuator assembly being configured to rotate the park pawl into the in-park position when the actuator is moved into the park-actuated position;

an actuator rod defining a proximal end and a distal end, the distal end of the actuator rod being slidably coupled to the actuator assembly;

a guide disposed about the actuator assembly and the distal end of the actuator rod, the actuator assembly being movable within the guide; and a main transmission system having a housing, the main transmission system comprising:

a park lever disposed in the housing, the park lever rotatably attached to the proximal end of the actuator rod, the park lever being rotatable to move the actuator rod with respect to the guide, the park lever being rotatable between a first position corresponding to the park-actuated position of the actuator assembly and a second position corresponding to the park-disengaged position of the actuator assembly;

a park actuator motor disposed in the housing, the park actuator motor configured to cause rotation of the park lever to move the actuator rod, the actuator rod being configured to pull the actuator assembly into the park-disengaged position by rotating the park lever; and a solenoid disposed in the housing adjacent to the park lever, the solenoid having a solenoid plunger, the solenoid being configured to actuate the solenoid plunger to latch the park lever to hold the actuator assembly in the park-disengaged position.

19. The automatic transmission assembly of claim 18, the solenoid being a first solenoid and the solenoid plunger being a first solenoid plunger, the main transmission system further comprising a second solenoid having a second solenoid plunger, the second solenoid being configured to actuate the second solenoid plunger to latch the park lever to hold the actuator assembly in the park-disengaged position, the park lever having a first face and a second face opposed to the first face, the first face defining a first ramped slot and the second face defining a second ramped slot, the first solenoid plunger being disposed in the first ramped slot to latch the park lever to hold the actuator assembly in the park-disengaged position, and the second solenoid plunger being disposed in the second ramped slot to latch the park lever to the hold the actuator assembly in the park-disengaged position.

20. The automatic transmission assembly of claim 18, wherein the park lever is latched in the second position by moving the park actuator motor into a top dead center range position and the solenoid plunger into a slot defined within a face of the park lever.

* * * * *